United States Patent
Wager et al.

(10) Patent No.: US 9,614,652 B2
(45) Date of Patent: Apr. 4, 2017

(54) RADIO BASE STATIONS AND WIRELESS TERMINAL FOR DUAL CONNECTIVITY, METHODS THEREIN AND A SYSTEM

(71) Applicant: TELEFONAKTIEBOLAGET L M ERICSSON (PUBL), Stockholm (SE)

(72) Inventors: Stefan Wager, Espoo (FI); Fredrik Gunnarsson, Linköping (SE); Niklas Johansson, Sollentuna (SE); Magnus Stattin, Upplands Väsby (SE); Riikka Susitaival, Helsinki (FI); Vesa Virkki, Espoo (FI)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/782,064

(22) PCT Filed: Apr. 4, 2014

(86) PCT No.: PCT/SE2014/050416
§ 371 (c)(1),
(2) Date: Oct. 2, 2015

(87) PCT Pub. No.: WO2014/163576
PCT Pub. Date: Oct. 9, 2014

(65) Prior Publication Data
US 2016/0050054 A1    Feb. 18, 2016

Related U.S. Application Data

(60) Provisional application No. 61/808,679, filed on Apr. 5, 2013.

(51) Int. Cl.
*H04W 76/02* (2009.01)
*H04L 5/00* (2006.01)
*H04W 72/04* (2009.01)

(52) U.S. Cl.
CPC ....... *H04L 5/0035* (2013.01); *H04W 72/0413* (2013.01); *H04W 76/025* (2013.01)

(58) Field of Classification Search
None
See application file for complete search history.

(56) References Cited

U.S. PATENT DOCUMENTS 9,021,144 B2 * 4/2015 Damnjanovic ......... H04L 1/188
                                                   710/11
9,112,685 B2 * 8/2015 Gage ..................... H04L 5/0092
(Continued)

OTHER PUBLICATIONS

International Search Report dated Sep. 25, 2014, in International Application No. PCT/SE2014/050416, 5 pages.
(Continued)

*Primary Examiner* — Diane Mizrahi
(74) *Attorney, Agent, or Firm* — Rothwell, Figg, Ernst & Manbeck, P.C.

(57) ABSTRACT

Embodiments herein relate to a system for enabling communication in the radio communications network (1). The system comprises the first radio base station (12), the second radio base station (13) and the wireless terminal (10). The first radio base station (12) and the second radio base station (13) are configured to serve the wireless terminal (10) simultaneously. The first radio base station (12) is configured to set up to the wireless terminal (10), a first channel for receiving data over from the wireless terminal (10), and a first assisting channel for transmitting feedback data regarding transmissions over the first channel. The second radio base station (13) is configured to set up to the wireless terminal (10), a second channel for transmitting data over to the wireless terminal (10), and a second assisting channel for receiving, from the wireless terminal (10), feedback data regarding transmissions over the second channel.

29 Claims, 19 Drawing Sheets

(56) References Cited

U.S. PATENT DOCUMENTS

| | | | | |
|---|---|---|---|---|
| 2012/0201219 | A1* | 8/2012 | Wager | H04L 1/1812 370/329 |
| 2013/0215784 | A1* | 8/2013 | Nordstrom | H04W 72/085 370/252 |
| 2013/0250882 | A1* | 9/2013 | Dinan | H04W 72/0426 370/329 |
| 2013/0343321 | A1* | 12/2013 | Nordstrom | H04W 72/1226 370/329 |
| 2015/0222409 | A1* | 8/2015 | Wang | H04W 72/0406 370/329 |

OTHER PUBLICATIONS

Written Opinion of the International Searching Authority dated Mar. 30, 2015, in International Application No. PCT/SE2014/050416, 12 pages.

Qingyang Hu et al "Mobile Association in a Heterogeneous Network" Communications (ICC), 2010 IEEE International Conference on May 23, 2010, 6 pages.

Ericsson "Small cell challenges and benefits of dual connectivity" 3GPP TSG-RAN, WG2 #81, TDOC R2-130416, Malta, Jan. 28, 2013, 7 pages.

Matthew Baker "LTE-Advanced Physical layer" REV-090003R1 IMT-Advanced Evaluation Workshop Dec. 17, 2009, Beijing, 48 pages.

Research in Motion "Discussions on Protocol Stack support in Small Cell eNB" 3GPP TSG RAN WG2 Meeting#81, R2-130068, St. Julian's, Malta, Jan. 28, 2013, 7 pages.

NTT DOCOMO "Discussions on U-plane architecture for dual connectivity" 3GPP TSG-RAN WG2 #81, TDOC R2-130324, St. Julian's, Malta, Jan. 28, 2013, 6 pages.

Arnaud Meylan "LTE Radio Layer 2, RRC and Radio Access Network Architecture" 3GPP TSG-RAN WG2, REV-090004; 2010, 44 pages.

Ericsson "Protocol architecture alternatives for dual connectivity" 3GPP TSG-RAN WG2 #81, TDOC R2-130420, Malta, Jan. 28, 2013, 10 pages.

Samsung "Preliminary discussion on inter-ENB Carrier Aggregation" 3GPP TSG-RAN WG2 Meeting #81, R2-130099, St. Julian's, Malta, Jan. 28, 2013, 5 pages.

NEC "Consideration of the possible structures on the dual connectivity" 3GPP TSG-RAN WG2 Meeting #81, R2-130268, St. Julian's, Malta, Jan. 28, 2013, 5 pages.

3GPP, 3rd Generation Partnership Project; Technical Specification Group Radio Access Network; Study on Small Cell enhancements for E-UTRA and E-UTRAN; Higher layer aspects (Release 12), 3GPP TR 36.842 V12.0.0, 2013, 71 pages.

* cited by examiner

RADIO BASE STATIONS AND WIRELESS TERMINAL FOR DUAL CONNECTIVITY, METHODS THEREIN AND A SYSTEM

CROSS REFERENCE TO RELATED APPLICATION(S)

This application is a 35 U.S.C. §371 National Phase Entry Application from PCT/SE2014/050416, filed Apr. 4, 2014, designating the United States, and also claims the benefit of U.S. Provisional Application No. 61/808,679, filed Apr. 5, 2013. The disclosures of both pplications are incorporated herein their entirety by reference.

TECHNICAL FIELD

Embodiments herein relate to a wireless terminal, radio base stations, methods therein, and a system. In particular, embodiments herein relate to setting up dual connectivity for transmissions to/from the wireless terminal, wherein a first and second radio base station serve the wireless terminal simultaneously.

BACKGROUND

In a typical radio communications network, wireless terminals, also known as mobile stations and/or user equipments (UEs), communicate via a Radio Access Network (RAN) to one or more core networks. The RAN covers a geographical area which is divided into cell areas, with each cell area being served by a base station, e.g., a radio base station (RBS), which in some networks may also be called, for example, a "NodeB (NB)" or "eNodeB (eNB)". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. The base stations communicate over the air interface operating on radio frequencies with the wireless terminals within range of the base stations. Transmissions from the wireless terminals to the radio base station are defined as uplink (UL) transmissions and transmissions from the radio base station to the wireless terminal is defined as downlink (DL) transmissions.

In some versions of the RAN, several base stations are typically connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

A Universal Mobile Telecommunications System (UMTS) is a third generation mobile communication system, which evolved from the second generation (2G) Global System for Mobile Communications (GSM). The UMTS Terrestrial Radio Access Network (UTRAN) is essentially a RAN using Wideband Code Division Multiple Access (VVCDMA) and/or High Speed Packet Access (HSPA) for user equipments. In a forum known as the Third Generation Partnership Project (3GPP), telecommunications suppliers propose and agree upon standards for e.g. third generation networks and further generations, and investigate enhanced data rate and radio capacity.

Specifications for the Evolved Packet System (EPS) have been completed within the 3GPP and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base stations are directly connected to the EPC core network rather than to RNCs. In general, in E-UTRAN/LTE the functions of a RNC are distributed between the radio base stations, e.g., eNodeBs in LTE, and the core network. As such, the RAN of an EPS system has an essentially "flat" architecture comprising radio base stations without reporting to RNCs.

In heterogeneous networks, the radio base stations or eNBs have different DL output power, e.g., macro eNBs with high output power and pico eNBs with low output power. "Macro eNBs" meaning radio base stations providing radio coverage over a macro cell and "pico eNBs" meaning radio base stations providing radio coverage over a pico cell. This imbalance in the transmission power combined with the conventional cell selection mechanism leads to two problems.

In LTE, a Reference Signal Received Power-based (RSRP-based) cell selection scheme is often used. In this cell selection, wireless terminals are associated with the cell from which the strongest DL power is received. As the macro eNB has higher output power than the pico eNB, wireless terminals are more likely to connect to the macro cell or macro eNB. The pico cell size is thus relatively small compared to the macro cell size, which may result in low wireless terminal uptake and small macro offloading by the pico cell. In addition to that, with the RSRP-based cell selection scheme, some of the macro connected wireless terminals experience a lower path loss to the pico eNB, and thus are not connected to the best cell from an UL perspective.

To increase offloading of the macro cell by the pico cells and to improve UL performance, there is a need to increase the size of the pico cells. This can be done with Cell Range Expansion (CRE) based cell selection, where a Cell Selection Offset (CSO) is added to the RSRP of the pico eNB before comparison, see FIG. 1. FIG. 1 discloses UL/DL power imbalance and a cell range expansion. A macro base station comprises two transmitters of 20 W each and a pico base station comprises two transmitters of 0.5 W each. In FIG. 1 a cell border for DL is moved by CRE using a CSO. The UL border is kept as before. With CRE, a wireless terminal may be connected to a pico cell even though the received DL power from the macro cell is stronger. In case of inter-frequency deployment, a large CSO is conceivable for the DL but in case of intra-frequency deployment, applying a CSO introduces the additional challenge of strong DL interference.

There is an interference challenge in intra-frequency deployment; when the macro and pico layers are operated on the same frequency, pico wireless terminals, or wireless terminals connected to the pico, in the CRE region experience negative DL Signal to Interference plus Noise Ratio (SINR) due to strong DL interference caused by the macro cell. So, from a DL perspective, the CSO must be chosen considering the trade-off between signal quality reduction for wireless terminals in the CRE region and traffic offload improvement. It is often the case that a small to moderate value for the CSO is optimal for the DL. By contrast, from an UL perspective, a large CSO results in a better UL signal quality and a larger traffic offload by the pico layer. So, there is a mismatch between the optimal CSO for DL and UL in intra-frequency deployments.

To support large CSO values in the DL, time domain Inter-cell interference coordination (ICIC) and advanced wireless terminal receivers are supported in LTE release 10 and release 11 respectively. The idea is to protect the DL signals for pico wireless terminals in CRE region by applying almost blank subframes in the macro eNB and interference cancellation of Cell—specific Reference Signals (CRS) in the pico wireless terminals. However, these methods are supported for a CSO up to 9 dB only. This may not be sufficient to achieve the optimal cell border for the UL, which is when the CSO compensates for the transmit power imbalance between macro and pico eNBs. In addition, time domain ICIC has a negative impact on the capacity of the macro layer due to the reduction of schedulable subframes. So, these solutions have limitations to the supported CSO and may reduce the performance of the radio communications network.

SUMMARY

An object of embodiments herein is to provide a mechanism for enabling an improvement of the performance of a radio communications network.

According to a further aspect of embodiments herein the object is achieved by a system for enabling communication in a radio communications network. The system comprises a first radio base station, a second radio base station and the wireless terminal. The first radio base station and the second radio base station are configured to serve the wireless terminal simultaneously. The first radio base station is configured to set up to the wireless terminal, a first channel for receiving data over from the wireless terminal, and a first assisting channel for transmitting feedback data regarding transmissions over the first channel. The second radio base station is configured to set up to the wireless terminal, a second channel for transmitting data over to the wireless terminal, and a second assisting channel for receiving, from the wireless terminal, feedback data regarding transmissions over the second channel.

According to a further aspect of embodiments herein the object is achieved by a method in a wireless terminal for enabling communication in a radio communications network. The radio communications network comprises a first radio base station and a second radio base station serving the wireless terminal simultaneously. The wireless terminal sets up a first channel to the first radio base station for transmitting data over to the first radio base station, and a first assisting channel for receiving feedback data regarding transmissions over the first channel according to configuration received from the first base station. The wireless terminal further sets up, to the second radio base station, a second channel for receiving data over from the second radio base station, and a second assisting channel for transmitting feedback data regarding transmissions over the second channel according to configuration received from the second base station.

According to another aspect the object is achieved by a method in a first radio base station for enabling communication with a wireless terminal in a radio communications network. The radio communications network comprises the first radio base station and a second radio base station, wherein the first radio base station and second radio base station serve the wireless terminal simultaneously. The first radio base station is configured to receive uplink data from the wireless terminal, and the second radio base station is configured to transmit downlink data to the wireless terminal. The first radio base station sets up a first channel to the wireless terminal for receiving data over from the wireless terminal, and a first assisting channel for transmitting, to the wireless terminal, feedback data regarding transmissions over the first channel.

According to yet another aspect the object is achieved by a method in a second radio base station for enabling communication with a wireless terminal in a radio communications network. The radio communications network comprises a first radio base station and the second radio base station, wherein the first radio base station and second radio base station serve the wireless terminal simultaneously. The first radio base station is configured to receive uplink data from the wireless terminal and the second radio base station is configured to transmit downlink data to the wireless terminal. The second radio base station sets up a second channel to the wireless terminal for transmitting data over to the wireless terminal, and a second assisting channel for receiving, from the wireless terminal, feedback data regarding transmissions over the second channel.

According to still another aspect the object is achieved by a wireless terminal for enabling communication in a radio communications network, which radio communications network comprises a first radio base station and a second radio base station. The wireless device is configured to be served by the first radio base station and the second radio base station simultaneously. The wireless terminal being configured to set up, to the first radio base station, a first channel for transmitting data over to the first radio base station, and a first assisting channel for receiving feedback data regarding transmissions over the first channel according to configuration received from the first radio base station. Furthermore, the wireless terminal is configured to set-up, to the second radio base station, a second channel for receiving data over from the second radio base station, and a second assisting channel for transmitting feedback data regarding transmissions over the second channel according to configuration received from the second radio base station.

According to yet still another aspect the object is achieved by a first radio base station for enabling communication with a wireless terminal in a radio communications network. The radio communications network comprises the first radio base station and a second radio base station, wherein the first radio base station is configured to serve the wireless terminal simultaneously as the second radio base station. The first radio base station being configured to receive uplink data from the wireless terminal and the second radio base station is configured to transmit downlink data to the wireless terminal. The first radio base station further being configured to setup a first channel to the wireless terminal for receiving data over from the wireless terminal, and a first assisting channel for transmitting, to the wireless terminal, feedback data regarding transmissions over the first channel.

According to a furthermore aspect the object is achieved by a second radio base station for enabling communication with a wireless terminal in a radio communications network. The radio communications network comprises the second radio base station and a first radio base station, wherein the second radio base station is configured to serve the wireless terminal simultaneously as the first radio base station. The first radio base station is configured to receive uplink data from the wireless terminal and the second radio base station is configured to transmit downlink data to the wireless terminal. The second radio base station being configured to setup a second channel to the wireless terminal for transmitting data over to the wireless terminal, and a second assisting channel for receiving, from the wireless terminal, feedback data regarding transmissions over the second channel.

An advantage with embodiments herein is to enable increase of data transfer to and from the wireless terminal as the UL transmissions is performed to a first radio base station e.g. with better uplink performance and DL transmissions are performed from a second radio base station with e.g. a better downlink performance and hence the performance of the radio communications network may be improved.

BRIEF DESCRIPTION OF THE DRAWINGS

Embodiments will now be described in more detail in relation to the enclosed drawings, in which.

DETAILED DESCRIPTION

Figure 2A:
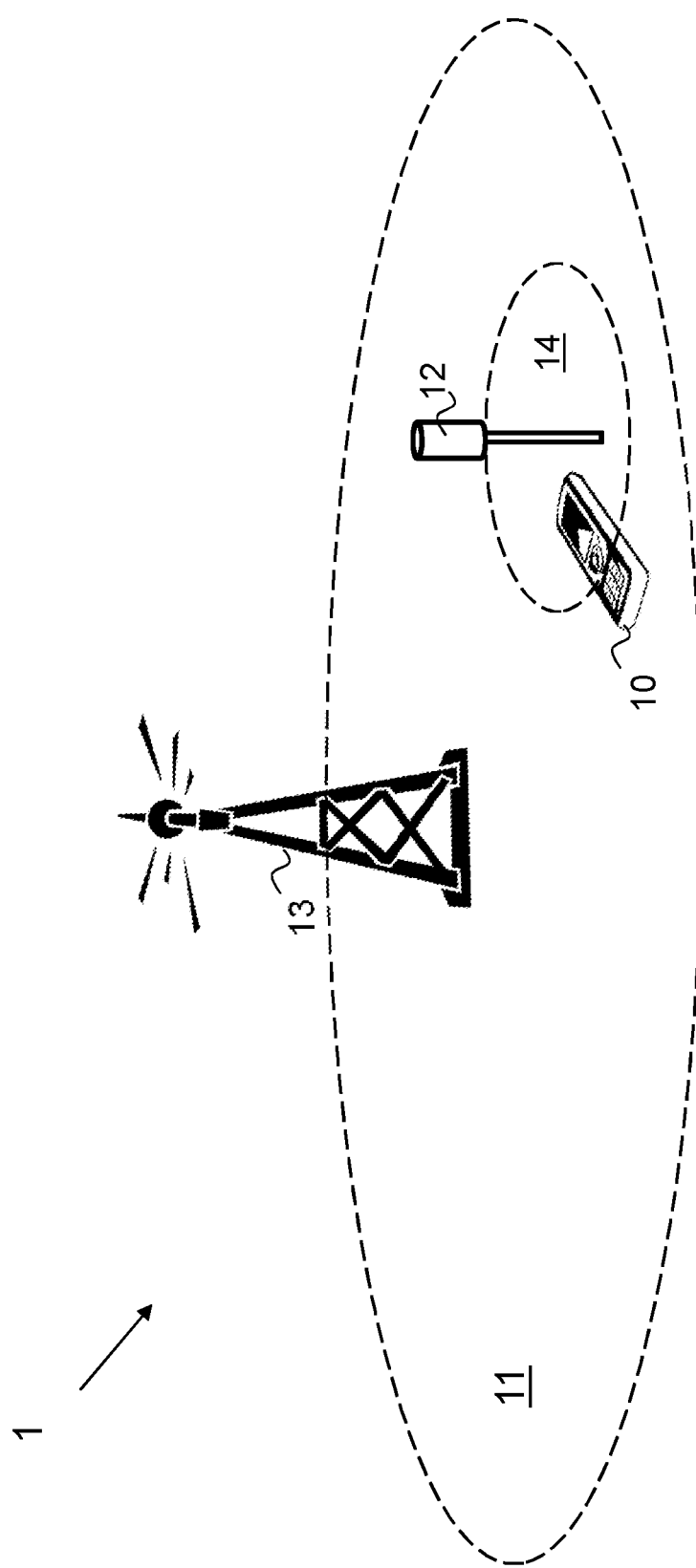
FIG. 2a shows a schematic overview depicting a radio communications network.

FIG. 2a is a schematic overview depicting a radio communications network 1 or a mobile network. The radio communications network comprises one or more RANs and one or more CNs. The radio communications network may use a number of different technologies, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations.

In the radio communications network, a wireless terminal 10, also known as a mobile station and/or a user equipment, communicates via a Radio Access Network (RAN) to one or more core networks (CN). It should be understood by the skilled in the art that "wireless terminal" is a non-limiting term which means any user equipment, Machine Type Communications (MTC) device or node e.g. Personal Digital Assistant (PDA), smart phone, laptop, mobile phone, sensor, relay, mobile tablets or even a small base station communicating within respective cell.

The radio communications network covers a geographical area which is divided into cell areas, e.g. a cell 11 being served by a second radio base station 13. The radio base station 13 may also be referred to as a radio base station. The second radio base station 13 may be referred to as e.g. a NodeB, an evolved Node B (eNB, eNode B), a base transceiver station, Access Point Base Station, base station router, or any other network unit capable of communicating with a user equipment within the cell served by the radio base station depending e.g. on the radio access technology and terminology used. The second radio base station 13 may serve one or more cells, such as the cell 11. In examples herein the second radio base station 13 is a macro base station or 'macro' for short.

A cell is a geographical area where radio coverage is provided by the radio base station equipment at a base station site. The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the cell 11 uniquely in the whole radio communications network 1 is also broadcasted in the cell 11. Furthermore, the radio communications network 1 comprises another, a different, or first radio base station 12. The first radio base station 12 provides radio coverage over a second cell 14, another or a different cell. In examples herein first radio base station 12 is a pico base station or 'pico' for short.

An interface between the first radio base station 12 and the second radio base station 13 may be an X2 interface.

With the proliferation of user friendly smart phones and tablets, the usage of high data rate services such as video streaming over the radio communications network is becoming commonplace, greatly increasing the amount of traffic in the radio communications networks. Thus, there is a great urgency in the radio communications network community to ensure that the capacity of radio communications networks keeps up increasing with this ever-increasing user demand. The latest systems such as LTE, especially when coupled with interference mitigation techniques, have spectral efficiencies very close to a theoretical Shannon limit. The continuous upgrading of current radio communications networks to support the latest technologies and densifying the number of radio base stations per unit area are two of the most widely used approaches to meet the increasing traffic demands.

Yet another approach that is gaining high attention is to use Heterogeneous Networks where the traditional preplanned macro base stations, known as the macro layer, are complemented with several low-powered base stations that may be deployed in a relatively unplanned manner. The 3$^{rd}$ Generation Partnership Project (3GPP) has incorporated the concept of Heterogeneous Networks as one of the core items of study in the latest enhancements of LTE, such as LTE release 11, and several low-powered base stations for realizing heterogeneous networks such as pico base stations, femto base stations, also known as home base stations or HeNBs, relays, and remote radio heads (RRH) have been defined.

Embodiments herein relate to serve the wireless terminal 10 from more than one radio base station simultaneously, and the possible reception of DL data from one radio base station while transmitting UL data to another radio base station. To increase offloading of e.g. the macro by the pico cells and to improve UL performance, an appropriate solution is to have dual connectivity to both radio base stations and allow the wireless terminal 10 to be connected in DL to the cell which offers the highest DL throughput, while being connected in the UL to the cell which offers the highest UL throughput, which is typically the cell to which the path loss is lowest. This is particularly beneficial for the case where e.g. the macro and pico layers operate on the same frequency, as the possible CSO is limited due to DL interference problems in the CRE region.

In the sequel, macro cell will mean the cell 11 to which the wireless terminal 10 is connected for DL traffic, while pico cell means the second cell 14 to which the wireless terminal 10 is connected for UL traffic. This is adopted without loss of generality, since in this context macro and pico represents different roles for traffic handling towards the wireless terminal 10.

Embodiments herein split UL and DL traffic, which split is enabled by assisting channels that are set up or configured for signaling, and the assisting channels comprise a first assisting downlink channel, or first assisting channel, from first radio base station 12, to support UL traffic from the wireless terminal 10 to the first radio base station 12, and a second assisting channel to the second radio base station 13 from the wireless terminal 10 to support DL traffic from second radio base station 13 to the wireless terminal 10.

An advantage of embodiments herein is to provide an efficient way for the wireless terminal 10 to transmit data over a first channel to the first radio base station 12, denoted 'pico' in some embodiments, and to receive data over a second channel from the second radio base station 13, denoted as 'macro' in some embodiments. Thus, the first radio base station 12 receives data, UL traffic, from the wireless terminal 10 over the first channel and the second radio base station 13 transmits data, DL traffic, to the wireless terminal 10 over the second channel. It should be understood that it may be the other way around, i.e., the pico may provide DL data and the macro may receive UL data. Respective radio base station sets up one or more assisting channels to the wireless terminal 10 for supporting DL/UL traffic to or from the wireless terminal 10. The assisting channels are used for providing feedback data such as acknowledgment or non-acknowledgments received data. E.g. the wireless terminal 10 may transmit feedback data to the second radio base station 13 over a Physical Uplink Shared Channel (PUSCH) and the first radio base station 12 may transmit feedback to the wireless terminal 10 over a Physical Downlink Shared Channel (PDSCH).

UL/DL separation according to embodiments herein provides the advantage to apply load balancing separately for UL and DL, achieving optimal cell capacity in UL and DL. The network has the possibility to shift more UL traffic to the pico cell if the macro base station is loaded in the UL, while keeping DL traffic in the macro eNB. This is beneficial for both intra-frequency and inter-frequency deployments. E.g. the split is decided in one of the radio base stations. Input to the decision is measurement reports received from the wireless terminal 10, but also a cell load situation and a wireless terminal activity may be input to the decision. The decision is similar to that of regular handover, but may consider UL only. In Rel-12 dual connectivity, there is one radio base station such as the second radio base station 13 also labeled MeNB, which terminates the control plane signalling towards the wireless terminal 10, and this would be the radio base station deciding the split. When the second radio base station 13 receives suitable measurement report from the wireless terminal 10, the second radio base station 13 may request a neighboring eNB, such as the first radio base station 12 also labeled SeNB, to reserve resources for the wireless terminal 10 and establish UL connectivity. The first radio base station 12 may respond to the second radio base station 13 with the UL configuration for the wireless terminal 10, which the second radio base station 13 forwards to the wireless terminal 10.

Figure 2B:
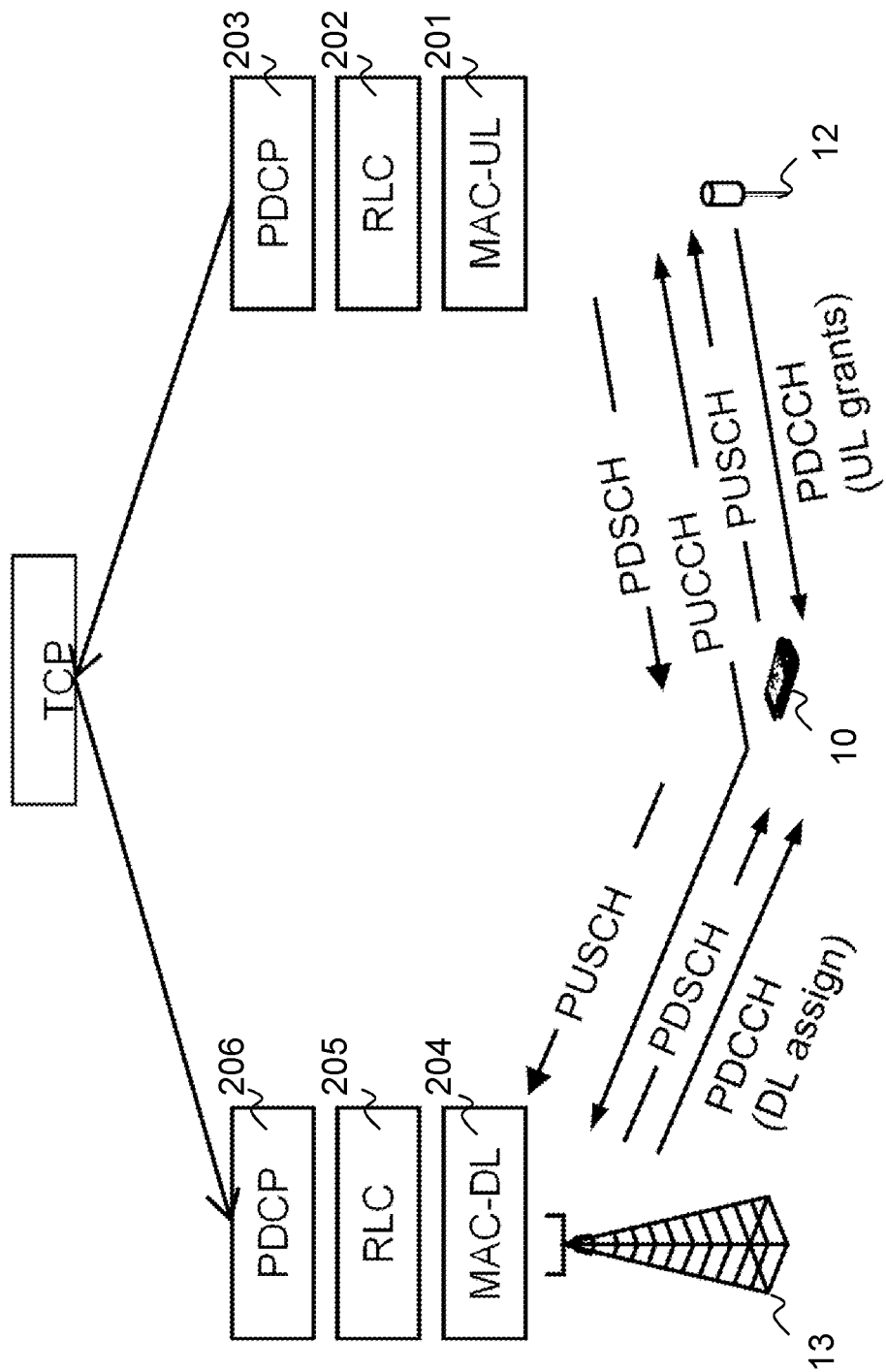
FIG. 2b shows UL/DL separation with dual connectivity according to some embodiments.

Separating the UL and DL transmission paths between e.g. macro eNodeBs and pico eNodeBs, provides the possibility to utilize the good uplink towards a low power node, e.g. the first radio base station 12, while maintaining the downlink from a high power node, e.g. the second radio base station 13. This is expected to provide gains in the range extension area of the low power node. In embodiments 1a and 1b a new EPS bearer is created so that the uplink bearer goes via the low power node and the downlink bearer comes from the high power node, node herein means radio base station. In these embodiments a local feedback is used, meaning that the feedback data such as Hybrid Automatic Repeat Request (HARQ), Radio Link Control (RLC) and Packet Data Convergence Protocol (PDCP) feedback is transmitted from the same radio base station, i.e. the first radio base station 12, which received the data for which the feedback applies, and to the same radio base station, i.e. the second radio base station 13, which transmitted the data for which the feedback applies. This in turn means that the first radio base station 12 may transmit feedback data over PDSCH, being an example of the first assisting channel, towards the wireless terminal 10 and the wireless terminal 10 may transmit feedback data over PUSCH, being an example of the second assisting channel, to second radio base station 13, see FIG. 2b. These physical data channels may be used only for RLC and PDCP feedbacks. The first radio base station 12 comprises a Medium Access Control (MAC)-UL entity 201, an RLC entity 202 and a PDCP entity 203. The second radio base station 13 comprises a MAC-DL entity 204, an RLC entity 205 and a PDCP entity 206. In the example in FIG. 2b, Higher Layer Transmission Control Protocol (TCP) data is transmitted from a TCP server in the network side to the wireless terminal 10 via the second radio base station 13, and corresponding TCP ACK, being an example of feedback data, are transmitted back from the wireless terminal 10 via the first radio base station 12 to the TCP server in the network. FIG. 2b shows UL/DL separation with dual connectivity. The control channels are used for DL assignments, UL grants and HARQ feedback. The Physical Downlink Control Channel (PDCCH) carries scheduling assignments for data transmissions on the Physical Downlink Shared Channel (PDSCH), also being an example of the second channel, from the second radio base station 13 to the wireless terminal 10. A Physical Uplink Control Channel (PUCCH), being an example of the second assisting channel, from the wireless terminal 10 to the second radio base station 13 carries acknowledgement of received data over the PDSCH. Similarly, a PDCCH from the first radio base station 12 to the wireless terminal 10 carries UL grants for uplink transmissions on the Physical Uplink Shared Channel (PUSCH), being an example of the first channel. PUCCH from the wireless terminal 10 to the first radio base station 12 carries scheduling request for requesting PUSCH resource for uplink data transmission. PDCCH or Physical Hybrid-ARQ Indicator Channel (PHICH) are used to acknowledge uplink data transmissions on PUSCH from the wireless terminal 10 to the first radio base station 12, and are both examples of the second assisting channel.

In UL/DL split even though the UL traffic and DL traffic is routed via different radio base stations it is assumed that HARQ-ACKs are transmitted/received locally, i.e. to/from the radio base station where the transmission/reception took place as the backhaul may not support HARQ-ACKs forwarding between the two radio base stations. In FIG. 2b it is illustrated how UL/DL split can be used to route UL traffic via the pico and DL traffic via the macro.

Two architecture alternatives to achieve UL/DL split are provided herein, one with bearer split and one with separate bearers.

In the bearer split alternative called embodiment 2 herein, one bearer is split over the second radio base station 13 and the first radio base station 12. Feedback data in the form of RLC ACKs for the DL traffic is transmitted to the first radio base station 12 and routed via the backhaul. To route RLC ACKs is not expected to be a problem as the load generated by the RLC ACKs is low.

In the separate bearer alternative called embodiments 1a and 1b herein there are two bearers, one bearer to the second radio base station 13 and another bearer to the first radio base station 12. It would in this case be possible to send also the RLC-ACKs locally. This solution may require separate PDCP and RLC entities.

Figure 3:
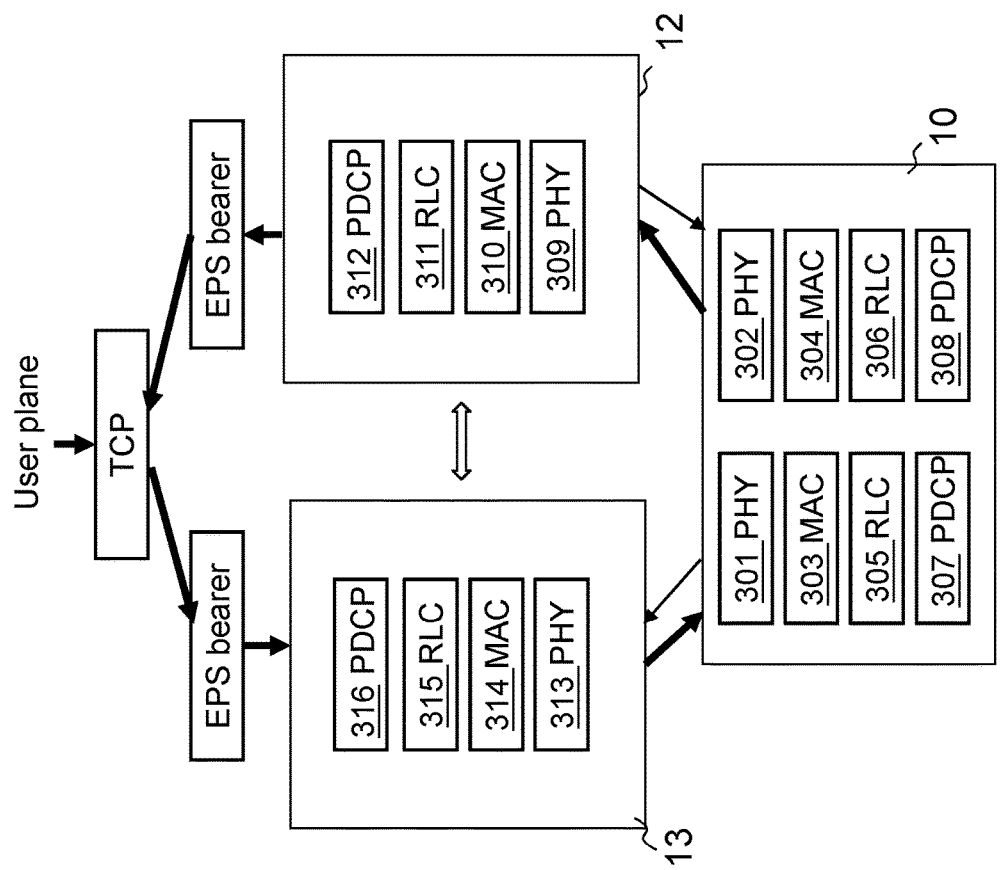
FIG. 3 shows the protocol architecture in the radio communications network according to some embodiments herein.

Error! Reference source not found. shows the protocol architecture in the radio communications network 1 according to some embodiments herein, including the wireless terminal termination. As can be seen, since the UL and DL data, thick arrows, are handled by separate EPS bearers separate protocol entities for Physical Layer (PHY) 301,302, MAC 303,304, RLC 305,306 and PDCP 307,308 are required in the wireless terminal 10 to handle and acknowledge the DL and UL traffic. The feedback data over the radio interface is travelling along the narrow arrows. The first radio base station 12 comprises a PHY entity 309, a MAC entity 310, an RLC entity 311 and a PDCP entity 312. The second radio base station 12 comprises a PHY entity 313, a MAC entity 314, an RLC entity 315 and a PDCP entity 316. FIG. 3 shows User plane Protocol termination in the wireless terminal 10 and first and second radio base stations 12,13 in an embodiment denoted as embodiment 1a.

Figure 1:
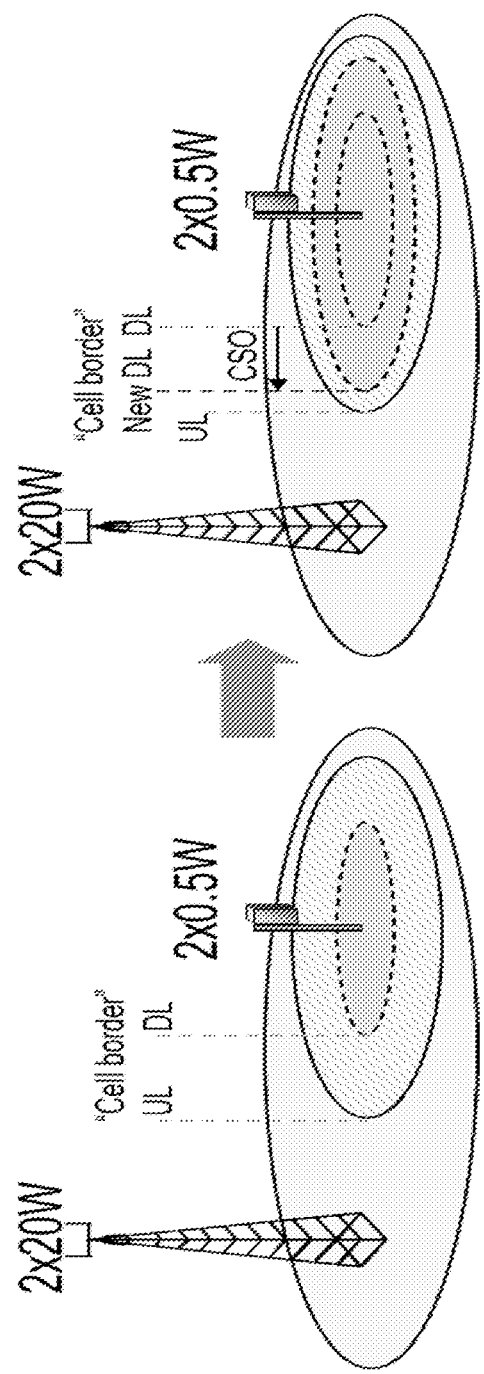
FIG. 1 is a schematic overview depicting cell range expansion in a radio communications network.
Figure 4:
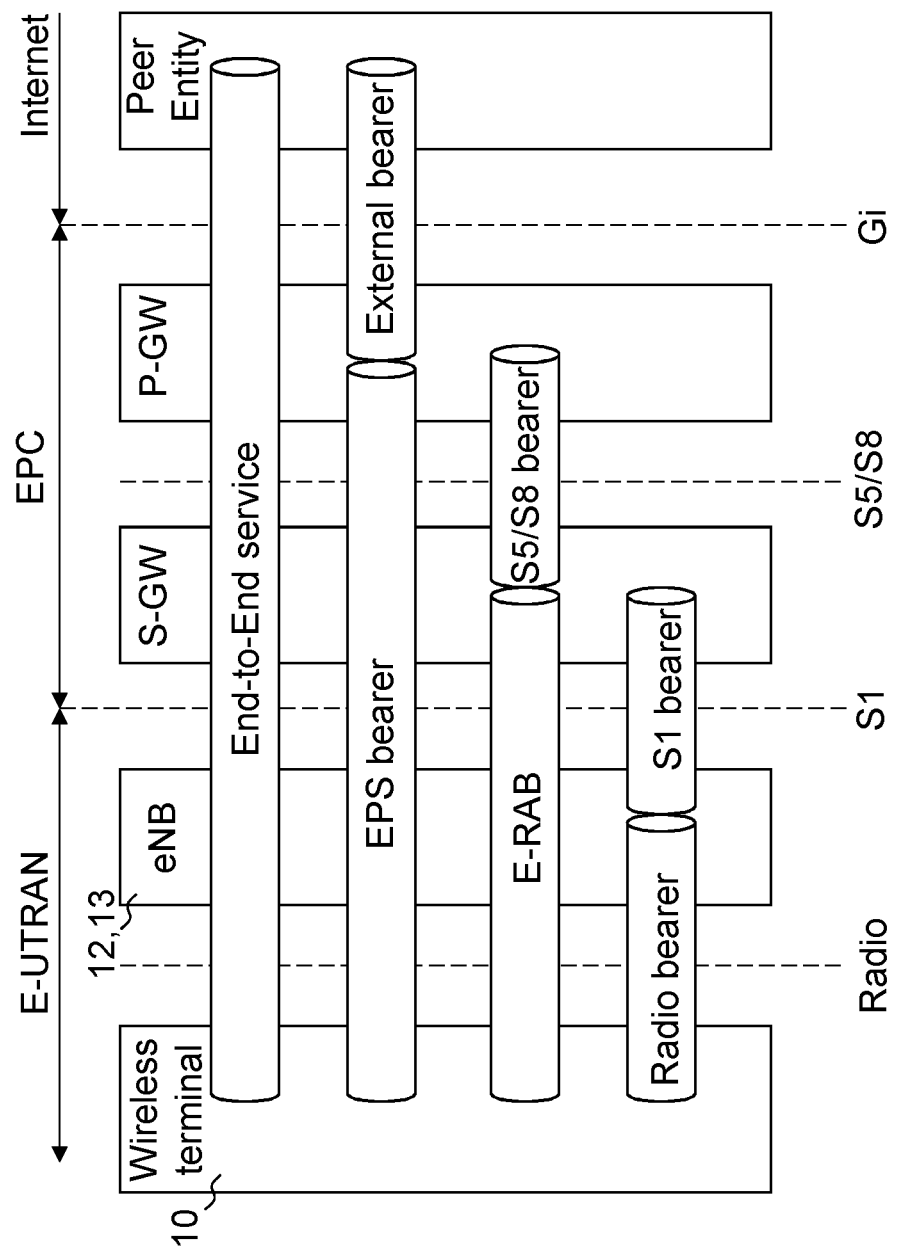
FIG. 4 shows bearers between different nodes in the radio communications network.
Figure 5:
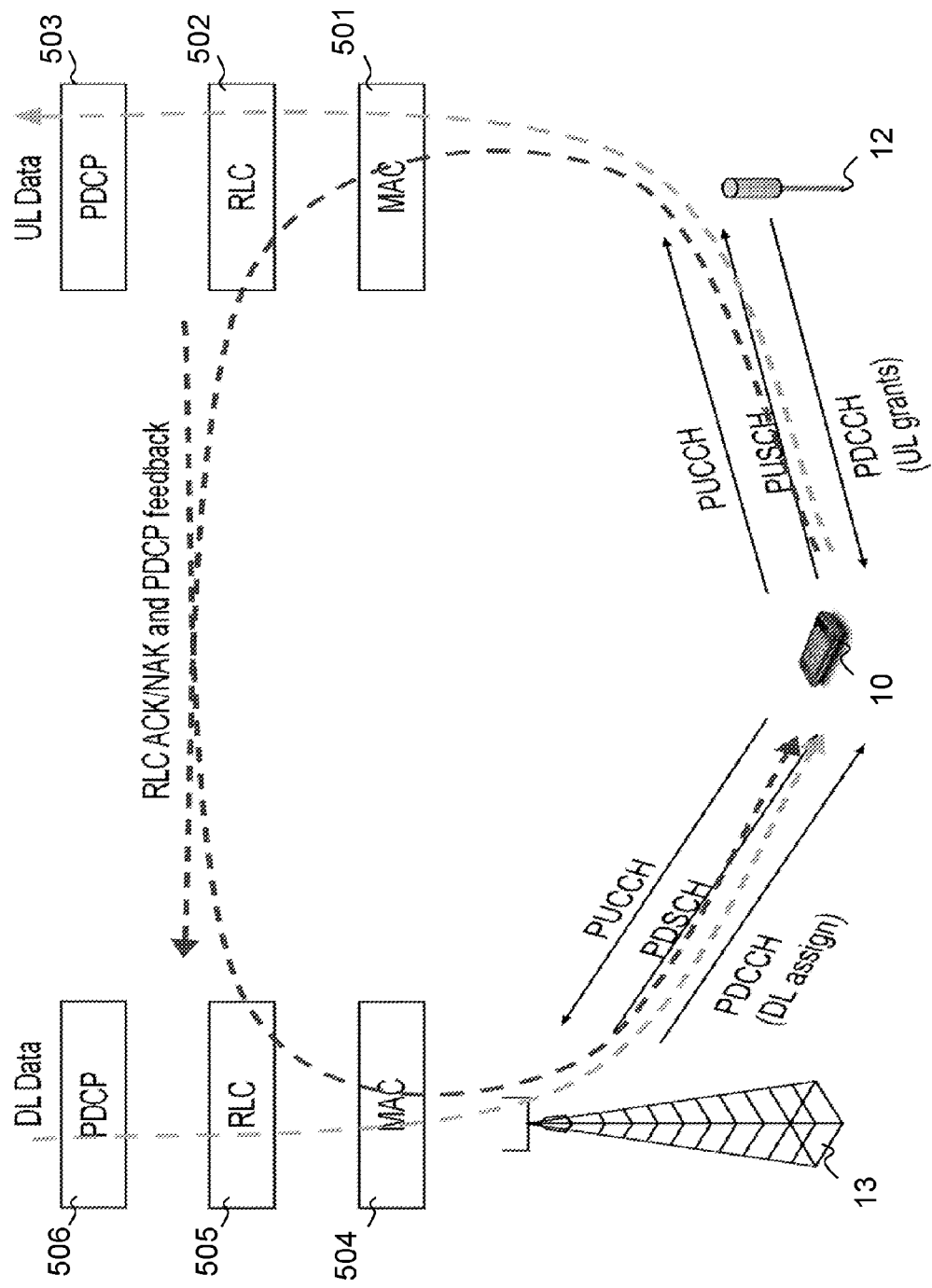
FIG. 5 shows UL/DL separation with dual connectivity according to some embodiments.

An alternative embodiment, denoted as embodiment 1b, is to realize the UL/DL split with only one EPS bearer, but with two different Evolved-Radio Access Bearers (E-RAB), one for DL traffic and one for UL traffic. Each of the E-RABs from the wireless terminal 10 will terminate in a Serving Gateway (S-GW), and will be unified into one EPS bearer that is terminated in a Packet Gateway (P-GVV) via one or more S5/S8 bearers, see FIG. 4. FIG. 1 shows E-RAB and EPS bearers. Data is sent over a radio bearer over a radio interface between the wireless terminal 10 and each radio base station 12,13 denoted as eNB in FIG. 4. The data is sent in a S1 bearer over a S1 interface between the eNB and the S-GW. Data travelling between the P-GW and a Peer entity is sent over an external bearer and data is provided over an end-to-end service between the wireless terminal and the peer entity.

In another embodiment, denoted as embodiment 2, the main idea is to have one split EPS bearer where PDCP and RLC feedback for downlink transmission, data from the second radio base station 13 to the wireless terminal 10, is transmitted from the wireless terminal 10 to the first radio base station 12 and then over the backhaul to the second radio base station 13 and from the first radio base station 12 over the backhaul to the second radio base station 13 and onwards to the wireless terminal 10 for uplink transmissions. This means that local HARQ feedback is used as in embodiments 1a and 1b but that the first radio base station 12 does not need to support PDSCH towards the wireless terminal 10 and that the wireless terminal 10 does not need to support PUSCH towards the second radio base station 13, see Error! Reference source not found. FIG. 2 shows UL/DL separation with RLC and PDCP feedback over a backhaul link. The first radio base station 12 comprises a MAC entity 501, an RLC entity 502 and a PDCP entity 503. The second radio base station 13 also comprises a MAC entity 504, an RLC entity 505 and a PDCP entity 506. According to these embodiments RLC ACK/NAK and PDCP feedback is transmitted between the respective entities of the radio base stations 12,13, marked as the dark dashed lines. The data transmissions are marked with light dashed lines "UL data" and "DL data". It should here be noted a HARQ feedback is a fast and frequent manner to correct transmission errors, resulting in a low end-to-end roundtrip time. HARQ feedback is more susceptible to error as compared to RLC feedback. A low packet error rate is desirable for e.g. high-speed transmissions using protocols like TCP, and RLC feedback adds robustness to the transmission. PUCCH towards the second radio base station 13 and PDCCH towards the first radio base station 12 are examples the assisting channels.

Figure 6:
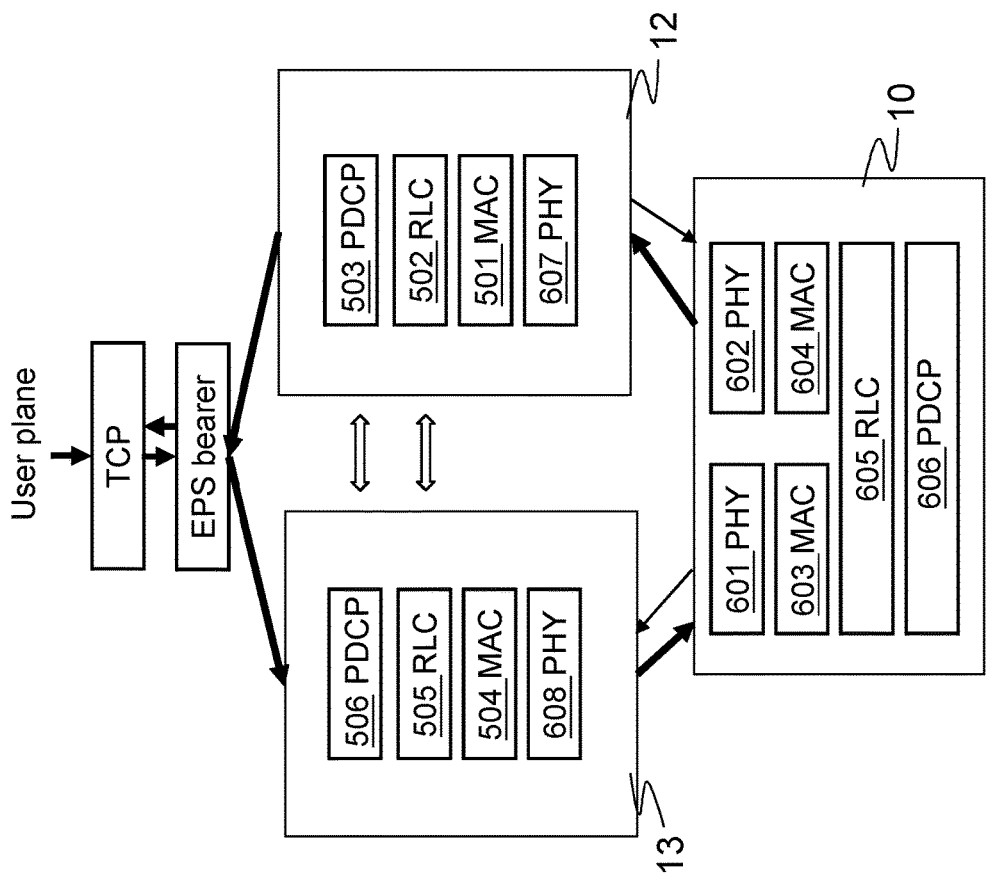
FIG. 6 shows a protocol architecture according to embodiment 2.

Error! Reference source not found. shows a protocol architecture, including the wireless terminal termination. FIG. 6 shows User plane Protocol termination in the wireless terminal 10 and the second radio base station 13 and the first radio base station 12 according to embodiment 2. RLC status, also referred herein as RLC ACK/NAK, and PDCP feedback may be transmitted between the first radio base station 12 and the second radio base station 13 over a backhaul 13 marked with hollow double arrows. As can be seen, since we have independent resource allocations, HARQ processes etc, separate protocol entities, such as a first PHY entity 601 and a second PHY entity 602 as well as a first MAC entity 603 and a second MAC entity 604, are required in the wireless terminal 10 for MAC and PHY, whereas, since there is one common bearer for UL and DL traffic, a common protocol entity is used in the wireless terminal 10 for RLC and PDCP, a common RLC 605 and a common PDCP 606. The first radio base station 12 comprises a PHY entity 607, the MAC entity 501, the RLC entity 502 and the PDCP entity 503. The second radio base station 13 comprises a PHY entity 607, the MAC entity 501, the RLC entity 502 and the PDCP entity 503.

In both embodiments, embodiment 2 using bearer split and embodiments 1a-1b using separate bearers, based on very relaxed delay and capacity requirements on the backhaul link, separate PDCP and RLC entities may be used on the network side. This solution supports direct routing to the core network, meaning that the user data does not need to be routed via the second radio base station 13, but can be forwarded directly towards the core network node terminating the bearer, typically the P-GW.

MAC Aspects

This part is common for both embodiments 1 (a&b) and 2.

Shared Channel Data Transfer

Downlink (DL)

DL assignments are handled separately for the second radio base station 13 to wireless terminal 10 data transfer and for the first radio base station 12 to the wireless terminal 10 data transfer. The wireless terminal 10 may be configured to receive DL assignments on the PDCCH from the second radio base station 13 that indicates if there is a transmission on PDSCH from the second radio base station 13. The DL assignment may include HARQ information. In some examples of embodiments 1a and 1b, the wireless terminal 10 is also configured to receive downlink assignments on the PDCCH from first radio base station 12 that indicates if there is a transmission on PDSCH from the first radio base station 12.

Referring back to Error! Reference source not found.b, the wireless terminal 10 is arranged to receive one PDSCH from the second radio base station 13, and one PDSCH from the first radio base station 12, where the former comprise downlink traffic from the second radio base station 13, while the latter PDSCH, required e.g. in embodiments 1a and 1b, comprise feedback data or information needed for uplink traffic handling to the first radio base station 12. This means that the DL HARQ structure in the wireless terminal 10 will be configured with one HARQ entity for PDSCH from the second radio base station 13, and one HARQ entity for PDSCH from the first radio base station 12, required e.g. in embodiments 1a and 1b.

Note that also enhanced PDCCH (ePDCCH) may be used to convey downlink information such as DL assignments.

Also, the wireless terminal 10 may be configured to transmit HARQ feedback, over either PUCCH or PUSCH, whether previous transmissions were successfully decoded or not both to the second radio base station 13, regarding PDSCH transmissions from the second radio base station 13, and to the first radio base station 12, regarding PDSCH transmissions from the first radio base station 12 in embodiments 1a and 1b.

Moreover, the wireless terminal 10 is configured to transmit channel state information such as channel quality indicator (CQI) indicating the highest modulation and coding scheme that meets decoding performance requirements, rank indicator (RI)—number of usable data streams over connections featuring two or more streams, preferred precoding matrix indicator (PMI), precoding type indicator (PTI) reporting to distinguish slow from fast fading environments. Such channel state information concerns downlink transmission aspects, and the wireless terminal 10 only transmits the Channel State Information (CSI) feedback to the second radio base station 13.

Uplink

Similarly, the wireless terminal 10 is arranged to transmit one PUSCH to the second radio base station 13, e.g. in embodiments 1a and 1b, and one PUSCH to the first radio base station 12, where the latter comprise uplink traffic, while the former comprise feedback information needed for downlink traffic handling.

This means that the UL HARQ structure in the wireless terminal 10 will be configured with one HARQ entity for PUSCH to the second radio base station 13, required e.g. in embodiments 1a and 1b, and one HARQ entity for PUSCH to the first radio base station 12.

Uplink grants are handled separately for "wireless terminal 10 to the second radio base station 13"—data transfer and for "wireless terminal 10 to the first radio base station 12"—data transfer. The wireless terminal 10 is configured to receive a valid uplink grant on e.g. the PDCCH from the second radio base station 13 or which may be configured semi-persistently, and deliver the uplink grant to the "wireless terminal 10 to second radio base station 13"—HARQ entity, or a second HARQ entity of the wireless terminal 10, comprised e.g. in embodiments 1a and 1b. Furthermore, the wireless terminal 10 may be configured to receive a valid uplink grant on e.g. the PDCCH from the first radio base station 12 or which may be configured semi-persistently, and may deliver the uplink grant to the "wireless terminal 10 to the first radio base station 12" HARQ entity, or a first HARQ entity of the wireless terminal 10.

In addition, the wireless terminal 10 is configured to receive HARQ feedback whether previous transmissions were successfully decoded or not both from the second radio base station 13, regarding PUSCH transmissions to the second radio base station 13, e.g. in embodiments 1a and 1b, and from the first radio base station 12, regarding PUSCH transmissions to the first radio base station 12.

The wireless terminal 10 may also be configured to send a scheduling request (SR) to request uplink resources for new transmissions. Even though it is only the first radio base station 12 that receives uplink traffic, there may still be a need to also transmit SRs to the second radio base station 13, for example to handle RLC status reports, e.g. in embodiments 1a and 1b. The same holds for buffer status reports (BSR) and Power Headroom Reports (PHR). An alternative, which avoids SR to the second radio base station 13, is to use persistent or semi-persistent scheduling for feedback and RLC status reports to the second radio base station 13 from the wireless terminal, e.g. in embodiments 1a and 1b.

The wireless terminal 10 may maintain separate timing advance values for each of the two uplinks, where a timing advance value is defined as the uplink transmission time relative the downlink reception time. In order to maintain adequate timing advance values, both the second radio base station 13 and the first radio base station 12 may send timing advance commands as MAC control elements to the wireless terminal 10 for the respective timing advance adjustment.

Uplink Logical Channel Prioritization.

The uplink logical channels are prioritized in a specific order in legacy systems. Wth UL/DL split, some MAC control elements are handled differently for PUSCH to the second radio base station 13 and to the first radio base station 12.

PUSCH to macro or second radio base station 13, which is an example of the first assisting channel, as e.g. in embodiments 1a and 1b.

MAC control element for Cell Radio Network Temporary Identity Cell (C-RNTI) or data from UL-Common Control Channel (CCCH);

data from any Logical Channel, except data from UL-CCCH

PUSCH to pico or to the first radio base station 12, which is an example of the first channel MAC control element for C-RNTI or data from UL-CCCH;

MAC control element for uplink buffer status report (BSR), with exception of BSR included for padding;

MAC control element for power headroom report (PHR) or Extended PHR;

data from any Logical Channel, except data from UL-CCCH;

MAC control element for BSR included for padding

RLC Aspects

Figure 7:
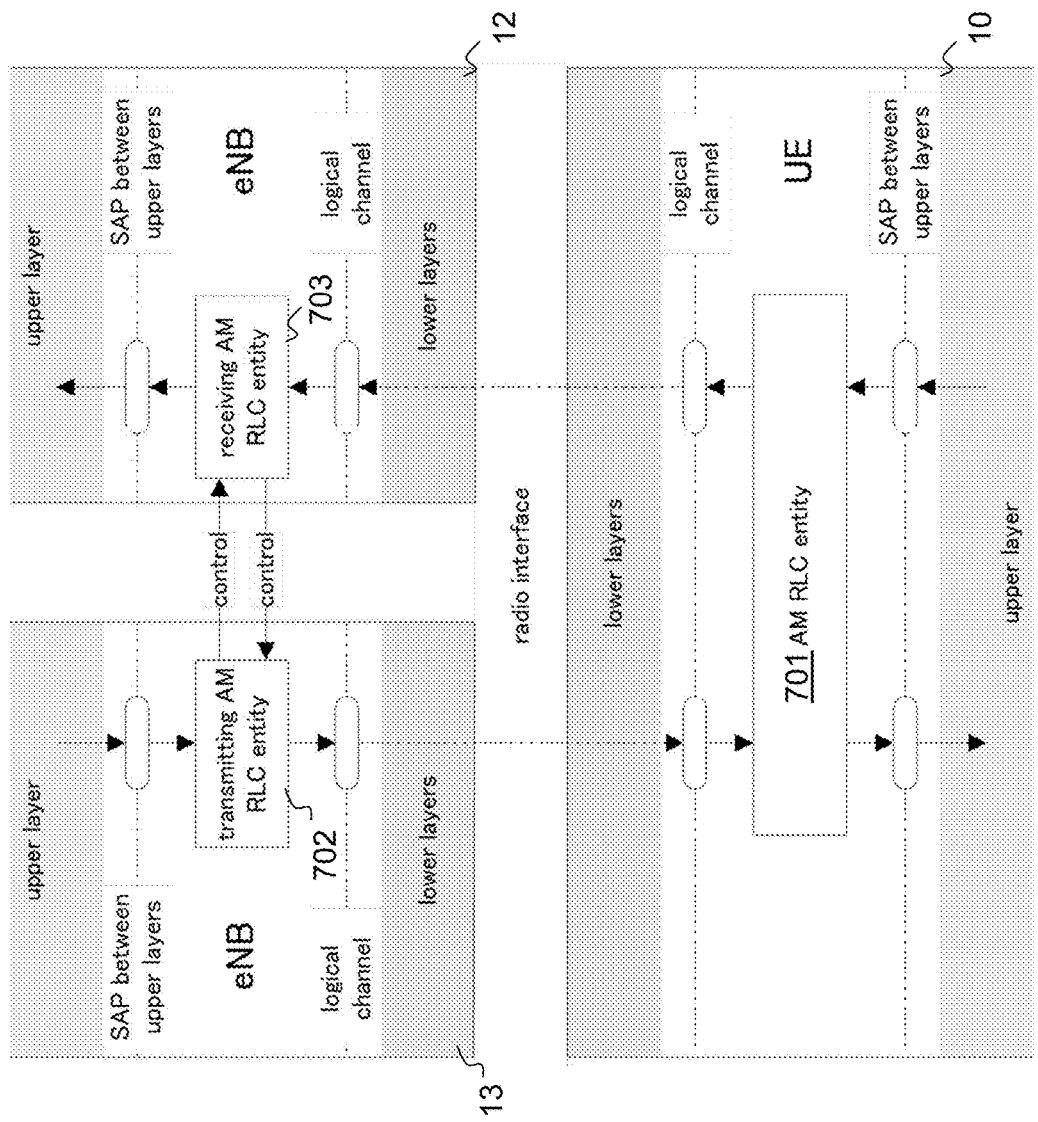
FIG. 7 AM RLC entity structure when UL and DL data transmissions are terminated in different points in the network side.

In embodiments 1a-1b the wireless terminal 10 and network, radio base stations 12,13, use
- "macro to UE"—PDSCH, or "second radio base station 13 to wireless terminal 10"—PDSCH, which is an example of the second channel for DL traffic
- "UE to macro"—PUSCH, or "wireless terminal 10 to second radio base station 13"—PUSCH, which is an example of the second assisting channel, for RLC feedback associated to the DL traffic
- "UE to pico"—PUSCH, or "wireless terminal 10 to first radio base station 12"—PUSCH, which is an example of the first channel, for UL traffic
- "Pico to UE"—PDSCH, or "first radio base station 12 to wireless terminal 10"—PDSCH, which is an example of the first assisting channel, for RLC feedback associated to the UL traffic In embodiment 2 the wireless terminal 10 and network, such as the radio base stations 12,13, use
- "macro to UE"—PDSCH, or "second radio base station 13 to wireless terminal 10"—PDSCH, which is an example of the second channel but also the first assisting channel, for DL traffic and control, including RLC status reports and control associated with UL traffic
- "UE to pico"—PUSCH, or "wireless terminal 10 to first radio base station 12"—PUSCH, which is an example of the first channel but also the second assisting channel, for UL traffic and control, including RLC status reports and control associated with DL traffic In embodiment 2 the wireless terminal 10 comprises an Acknowledged Mode Radio Link Control (AM RLC) entity 701. Furthermore, a network AM RLC entity is split into a transmitting AM RLC entity 702 residing in the second radio base station 13 and a receiving AM RLC entity 703 residing in the first radio base station 12, see FIG. 7. The AM RLC entities are localized between lower layers, such as PHY and MAC, and higher layers, such as PDCP. Service Access Points (SAP) are logical connections between any two layers in the OSI model. The SAPs are used to exchange interface specific information between two layers. Two layers are bound together by means of SAPs. Control information is exchanged from the receiving AM RLC entity 703 (network side) to the transmitting AM RLC entity 702 regarding
- uplink status report associated with downlink transmissions, originating in the wireless terminal 10 and terminated in transmitting AM RLC entity 702
- downlink status report associated with uplink transmissions, originating in the receiving AM RLC entity 703 and terminated in the wireless terminal 10

To distinguish between data transmissions, to be routed towards the core network, and RLC status reports, to be routed towards the transmitting AM RLC entity 702, the receiving AM RLC entity 703 checks an indicator, e.g. Data/Control field in the RLC Packet Data Unit (PDU) header. Based on this, data is forwarded to higher layers whereas RLC status reports are forwarded to the transmitting AM RLC entity 702.

On the network side this may be done by transporting the RLC status report over an interface between the first radio base station 12 and the second radio base station 13 in a tunnel with a unique identifier associating the control information with the appropriate wireless terminal and RLC context, e.g. in a General Packet Radio Service (GPRS) Tunneling Protocol-User plane (GTP-U) tunnel.

Figure 8:
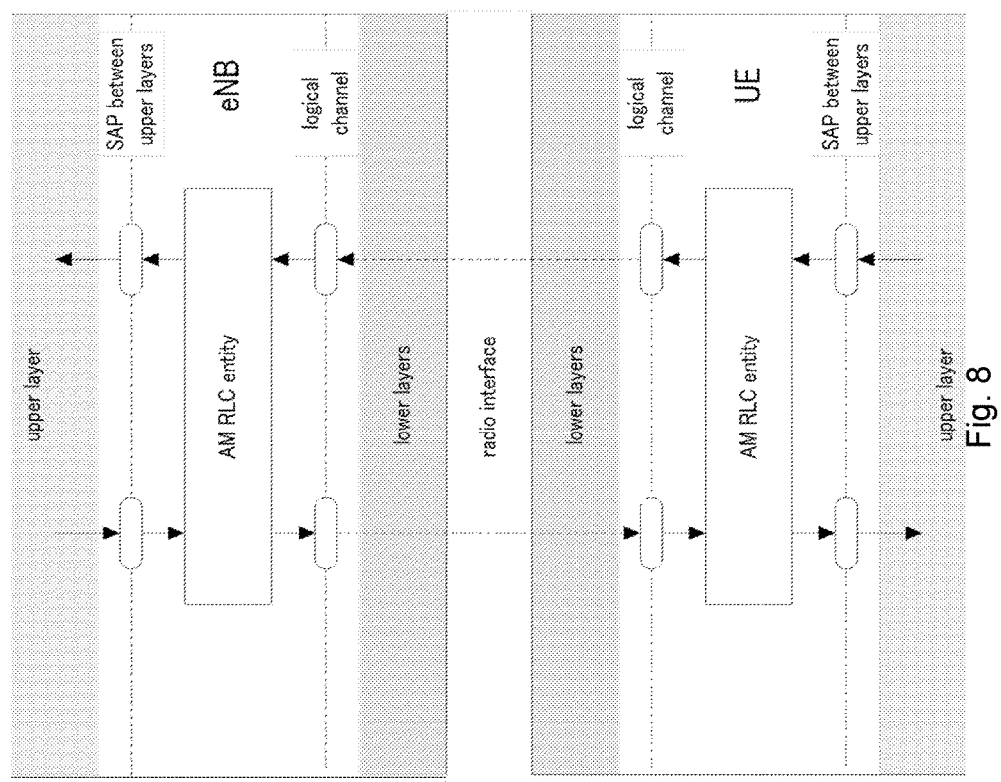
FIG. 8 AM RLC entity structure when UL and DL transmissions are terminated in the same point.

In addition, as a response to a poll request made by the wireless terminal 10 for made uplink transmissions, the receiving AM RLC entity 703 may also generate RLC status reports and forward it to the second radio base station 13 in a similar manner. The status report is then forwarded by the second radio base station 13 to the wireless terminal 10. FIG. 8 shows an AM RLC entity structure when UL and DL transmissions are terminated in the same point as compared to the AM RLC entity structure of FIG. 7 when UL and DL data transmissions are terminated in different points at the network side.

PDCP aspects

Solutions, procedures and embodiments disclosed for handling of RLC control information can be generalized and applied in a similar way to handling of PDCP control information, e.g., PDCP status reports and interspersed Robust Header Compression (ROHC) feedback packet.

RRC Aspects

RRC e.g. from the second radio base station 13 configures all protocol entities that are associated with the UL/DL separation, i.e. PDCP, RLC and MAC. In particular, RRC configures the PDCP entities with cryptographic keys and configuration data, such as which security algorithms to apply. The PDCP entities may be configured with separate cryptographic keys and configuration data.

Higher Layer Protocol Aspects

In some embodiments, also transport protocol acknowledgements are sent over the assisting channels. This means that the wireless terminal 10 may be configured to send such acknowledgement to the second radio base station 13 over the PUSCH to the second radio base station 13. Furthermore, the wireless terminal 10 may be configured to receive such acknowledgement from the first radio base station 12 over the PDSCH from the first radio base station 12.

Example of transport protocols that support acknowledgements includes Transmission Control Protocol (TCP), or the Stream Control Transmission Protocol (SCTP). The advantages of such transmissions may e.g. be reduced latency, in particular if UL and DL packets are routed along different paths, or if a proxy solution is used to enable prompt acknowledgement.

Figure 9:
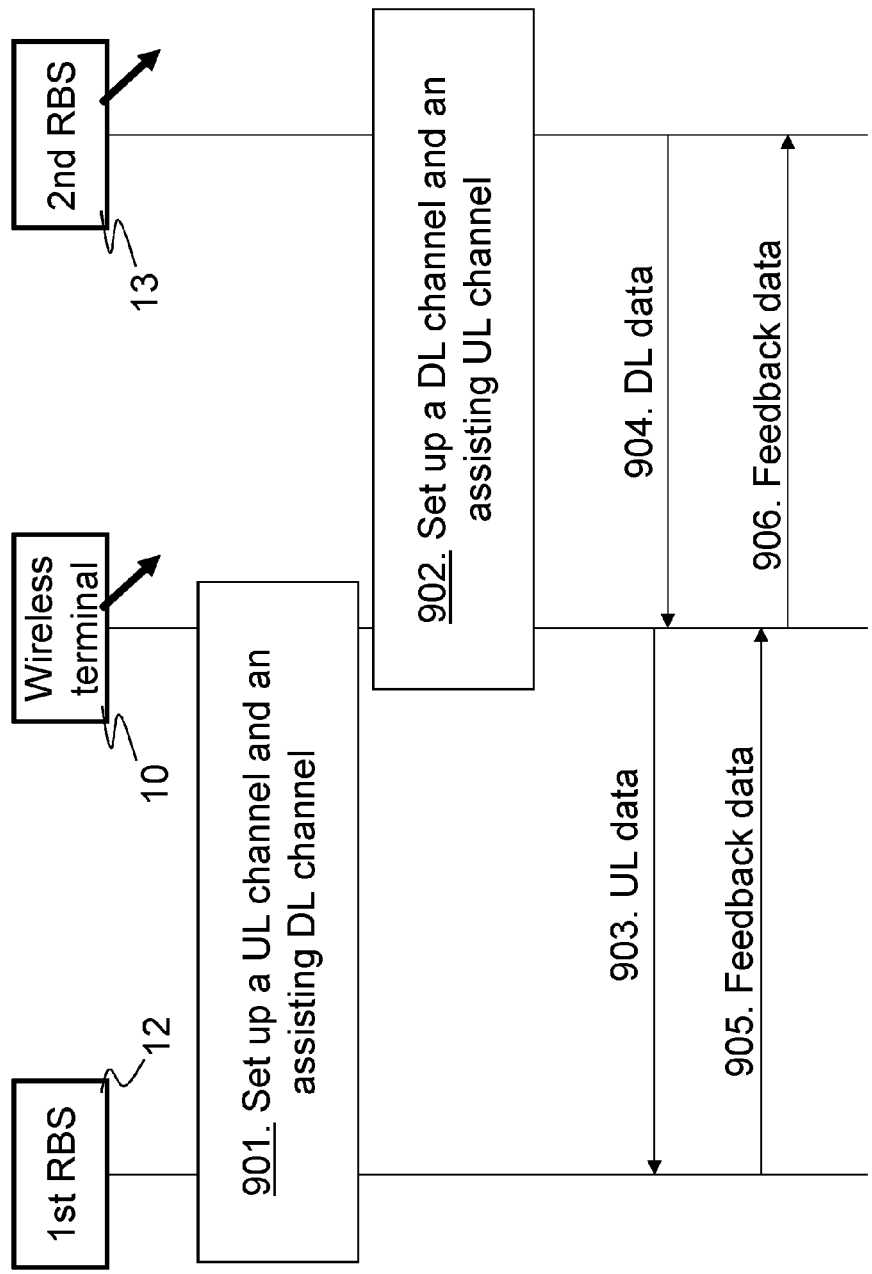
FIG. 9 shows a combined flowchart and signaling scheme according to embodiments herein.

FIG. 9 shows a combined flowchart and signalling scheme for setting up the channels and also transmissions over the setup channels. It should be understood that the actions may be performed in any suitable order and the order is not limited by the described examples herein.

Action 901. The first radio base station 12 and the wireless terminal 10 sets up the first channel being an UL channel for UL transmission from the wireless terminal 10. Also the first assisting channel, being a DL channel for e.g. HARQ, is set up or configured between the first radio base station 12 and the wireless terminal 10. The first assisting channel may go via the second radio base station 12, see embodiment 2 above. The wireless terminal 10 receives configuration from the first radio base station, e.g. via the second radio base station 13.

Action 902. The second radio base station 13 and the wireless terminal 10 sets up the second channel being a DL channel for DL transmission to the wireless terminal 10. Also the second assisting channel, being an UL channel for e.g. HARQ and/or RLC feedback from the second radio base station 13 is setup. The RLC status may be transmitted between the first and second radio base station, and may be used: by the receiving entity to inform the transmitting entity about missing PDUs at the receiving entity; by the receiving entity to inform the transmitting entity about the size of the allowed transmission window; by the transmitting entity to request the receiving entity to move the receiving window. The second assisting channel may go via the first radio base station 12, see embodiment 2 above. The first radio base station may be denoted eNB1 or $1^{st}$ RBS and the second radio base station may be denoted eNB2 or $2^{nd}$ RBS. However, the first radio base station may be eNB2 and the second radio base station may be eNB1.

It should here be noted that a plurality of assisting channels for receiving/providing feedback of transmissions from/to the wireless terminal 10 may be set up or used. For example, the first radio base station 12 may have the first assisting channel, e.g. a PHICH, setup to the wireless terminal 10 but also another, a third assisting channel, e.g. via backhaul to the second radio base station 13 or PDSCH to the wireless terminal 10, setup. Similarly, the second radio base station 13 may have the second assisting channel, e.g. a PUCCH, setup to the wireless terminal 10 but also another, a fourth assisting channel, e.g. via backhaul to the first radio base station 12 or PUSCH to the wireless terminal 10, setup.

Furthermore, the wireless terminal 10 may receive both DL and UL configuration from the same radio base station, e.g. the second radio base station 13, and the second radio base station 13 receives the UL configuration from the first radio base station. The second radio base station 13 may include configuration or UL configuration into a message such as an RRC message and transmit the message to the wireless terminal 10. The message comprises both configuration for DL configured by the second radio base station 13 and configuration for UL configured by first radio base station 12, which is different than in a normal handover process.

Action 903. Furthermore, the wireless terminal 10 may then transmit UL data over the first channel to the first radio base station 12 while being connected to the second radio base station 12.

Action 904. Similarly, the second radio base station 13 may transmit DL data to the wireless terminal 10 while the wireless terminal 10 is connected to the first radio base station 12. Thus, the wireless terminal 10 may receive DL data from one radio base station while transmitting UL data to another radio base station. In some examples herein a TCP packet is transmitted to the first radio base station 12 and the wireless terminal 10 receives an acknowledgment of the TCP packet from the second radio base station 13.

Action 905. The first radio base station 12 may then transmit feedback data on one or more channels to the wireless terminal 10. The feedback data being regarding transmissions over the first channel. For example, the first radio base station 12 may transmit HARQ feedback over the first assisting channel and RLC STATUS over the third assisting channel, or the vice versa, i.e. the first radio base station 12 may transmit HARQ feedback over the third assisting channel and RLC STATUS over the first assisting channel.

Action 906. The wireless terminal 10 may then transmit feedback data on one or more channels to the second radio base station 13. The feedback data being regarding transmissions over the second channel. For example, the wireless terminal 10 may transmit HARQ feedback over the second assisting channel and RLC STATUS over the fourth assisting channel, or the vice versa, i.e. the wireless terminal 10 may transmit HARQ feedback over the fourth assisting channel and RLC STATUS over the second assisting channel.

The FIG. 9 shows thus a system for enabling communication in the radio communications network 1. The system comprises the first radio base station 12, the second radio base station 13 and the wireless terminal 10. The first radio base station 12 and the second radio base station 13 are configured to serve the wireless terminal 10 simultaneously. The first radio base station 12 is configured to set up to the wireless terminal 10, a first channel for receiving data over from the wireless terminal 10, and a first assisting channel for transmitting feedback data regarding transmissions over the first channel. The second radio base station 13 is configured to set up to the wireless terminal 10, a second channel for transmitting data over to the wireless terminal 10, and a second assisting channel for receiving, from the wireless terminal 10, feedback data regarding transmissions over the second channel.

Below are examples of signaling schemes, see FIGS. 10-13, for transmissions over the set up channels.

Figure 10:
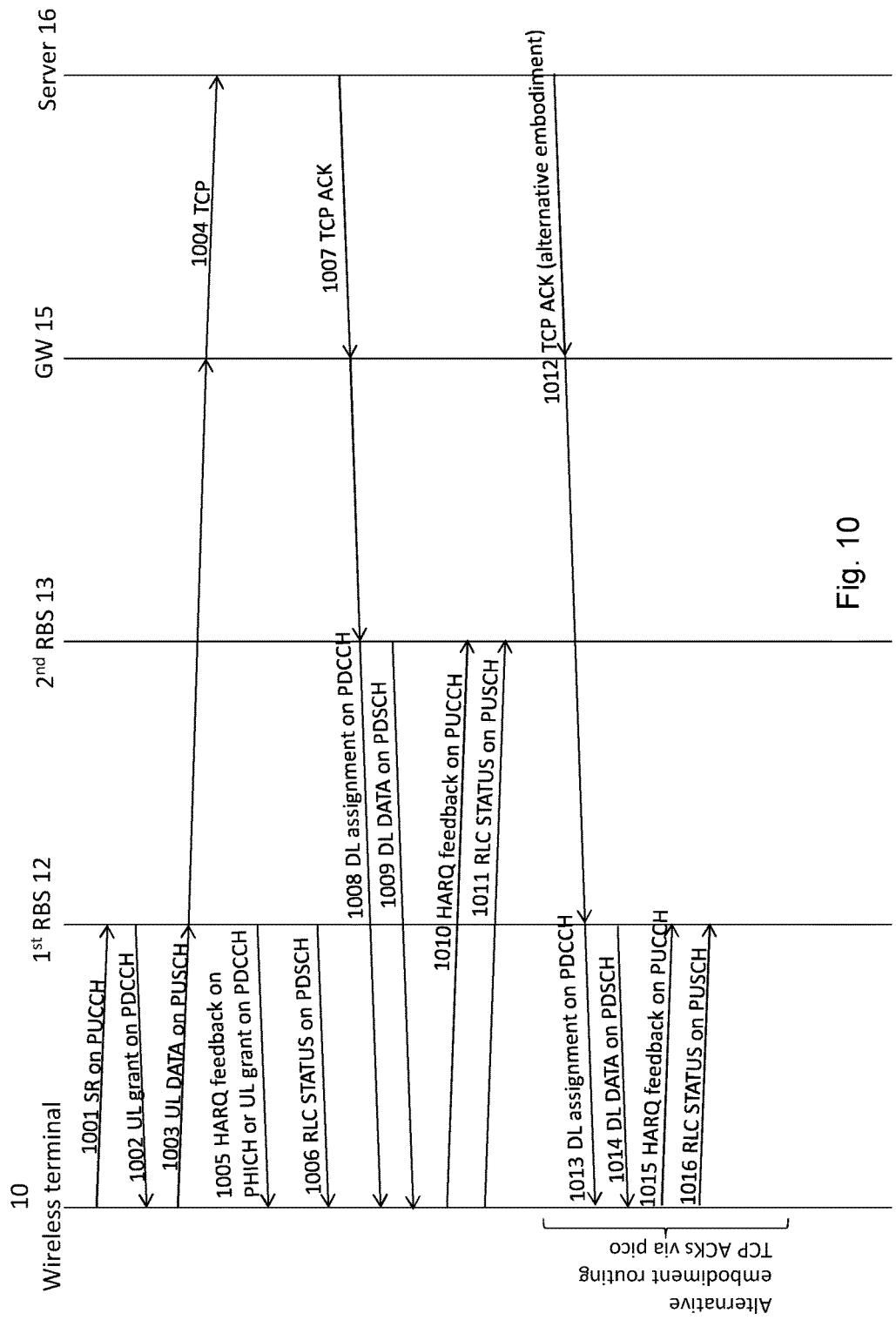
FIG. 10 shows an UL TCP transmission according to embodiments herein.

FIG. 10 shows examples of embodiments herein of a UL TCP transmission according to embodiments 1a & 1b.

Action 1001. The wireless terminal 10 has data to transmit and sends a SR on the PUCCH to the first radio base station 12.

Action 1002. The first radio base station 12 sends an UL grant on the PDCCH to the wireless terminal 10.

Action 1003. The wireless terminal 10 transmits UL data on the PUSCH to the first radio base station 12, which PUSCH being an example of the first channel.

Action 1004. The UL data may be transmitted to a gateway (GW) 15 and the GW 15 may transmit a TCP packet to a server 16 or TCP server in the radio communications network 1.

Action 1005. The first radio base station 12 may then provide HARQ feedback on Physical Hybrid Automatic Repeat Request Indicator Channel (PHICH) or UL grant on PDCCH to the wireless terminal 10, wherein the PHICH may be an example of the first assisting channel.

Action 1006. The first radio base station 12 may also transmit RLC status on PDSCH to the wireless terminal 10. PDSCH then being an example of the first assisting channel.

Action 1007. The server 16 may send an TCP ACK towards the wireless terminal 10 via the GW 15.

Action 1008. As the TCP ACK is DL data that goes through the second radio base station 13, the second radio base station 13 transmits a DL assignment on PDCCH to the wireless terminal 10.

Action 1009. The second radio base station 13 then transmits DL data on PDSCH to the wireless terminal 10, being an example of the second channel.

Action 1010. The wireless terminal 10 transmits HARQ feedback on PUCCH to the second radio base station 13.

Action 1011. The wireless terminal 10 may also transmit RLC status on PUSCH to the second radio base station. The PUCCH and the PUSCH to the second radio base stations are examples of the second assisting channel mentioned herein.

Thus, a TCP packet is transmitted to the first radio base station 12 and the wireless terminal 10 receives an acknowledgment of the TCP packet from the second radio base station 13

As an alternative embodiment the TCP ACK may be routed via the first radio base station, being e.g. a pico.

Action 1012. The server 16 transmits the TCP ACK to the first radio base station 12.

Action 1013. As the TCP ACK is DL data that goes through the first radio base station 12, the first radio base station 12 may transmit a DL assignment on PDCCH to the wireless terminal 10.

Action 1014. The first radio base station 12 may then transmit the DL data on PDSCH to the wirelss terminal 10.

Action 1015. The wireless terminal 10 may also transmit HARQ feedback on PUCCH to the first radio base station 12.

Action 1016. The wireless terminal 10 may transmit RLC status on PUSCH to the second radio base station 13. The PUSCH being an example of the second assisting channel. The wireless terminal 10 is connected to the two radio base stations 12,13, which is defined as dual connectivity.

Figure 11:
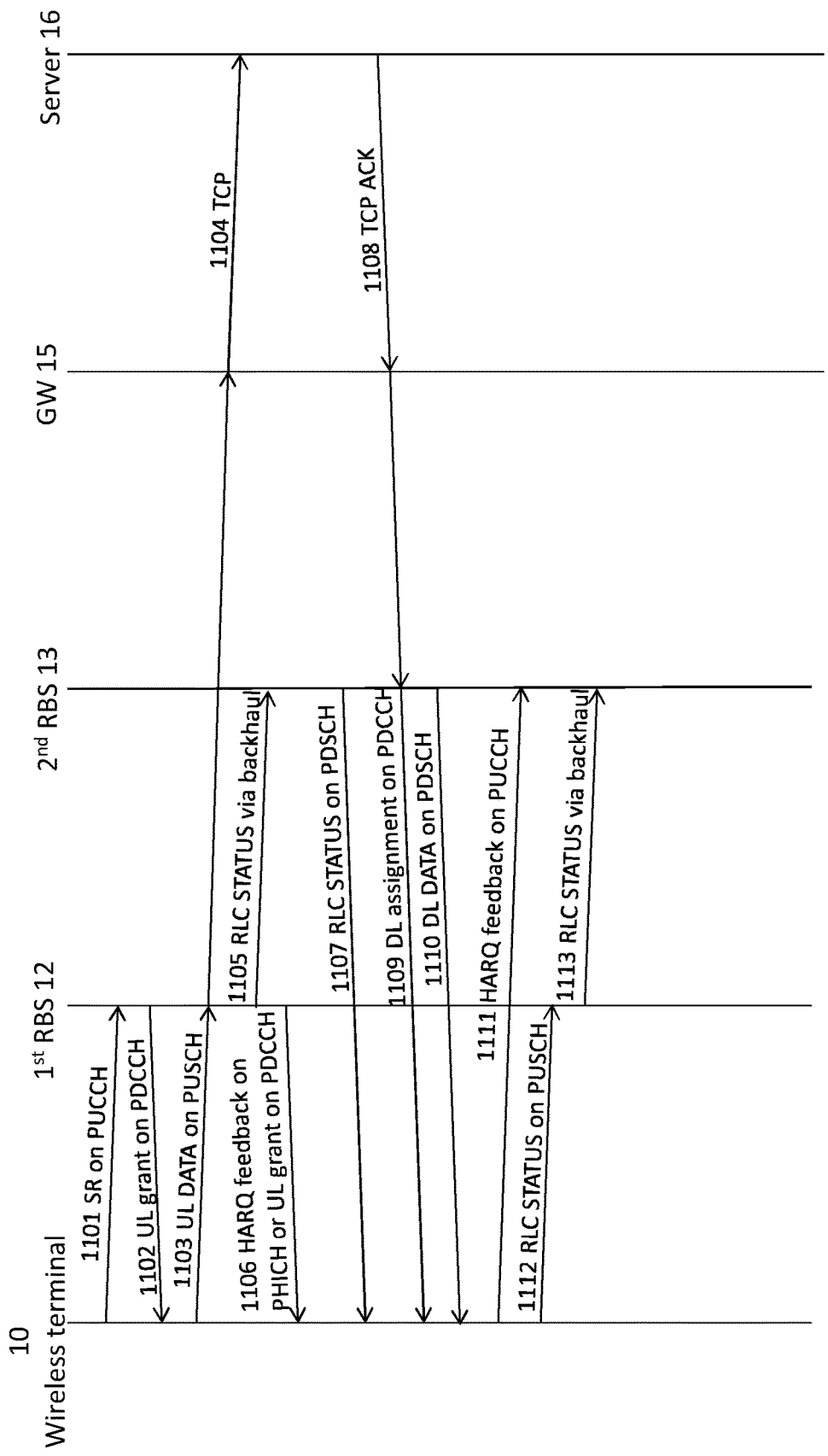
FIG. 11 shows an UL TCP transmission according to embodiments herein.

FIG. 11 shows an example of embodiments herein of a UL TCP transmission according to embodiment 2.

Action 1101. The wireless terminal 10 has data to transmit and sends a SR on the PUCCH to the first radio base station 12.

Action 1102. The first radio base station 12 sends an UL grant on the PDCCH to the wireless terminal 10.

Action 1103. The wireless terminal 10 transmits UL data on the PUSCH to the first radio base station 12, which PUSCH being an example of the first channel.

Action 1104. The UL data may be transmitted to the gateway (GW) 15 and the GW 15 may perform a TCP transmission to the server 16 or TCP server in the radio communications network 1.

Action 1105. The first radio base station 12 may also transmit RLC status via backhaul to the second radio base station 13.

Action 1106. The first radio base station 12 may then provide HARQ feedback on Physical Hybrid Automatic Repeat Request Indicator Channel (PHICH) or UL grant on PDCCH to the wireless terminal 10, wherein the PHICH being an example of the first assisting channel.

Action 1107. The second radio base station 13 then transmits the RLC status to the wireless terminal over PDSCH. The first assisting channel to the first radio base station 12 then being comprised of the backhaul and the PDSCH to the second radio base station 13.

Action 1108. The server 16 may send an TCP ACK towards the wireless terminal 10 via the GW 15.

Action 1109. As the TCP ACK is DL data that goes through the second radio base station 13, the second radio base station 13 transmits a DL assignment on PDCCH to the wireless terminal 10.

Action 1110. The second radio base station 13 then transmits DL data on PDSCH to the wirelss terminal 10.

Action 1111. The wireless terminal 10 transmits HARQ feedback on PUCCH to the second radio base station 13.

Action 1112. The wireless terminal 10 may also transmit RLC status on PUSCH to the first radio base station 12.

Action 1113. The first radio base station 12 then transmit the RLC status via backhaul to the second radio base station 13.

Figure 12:
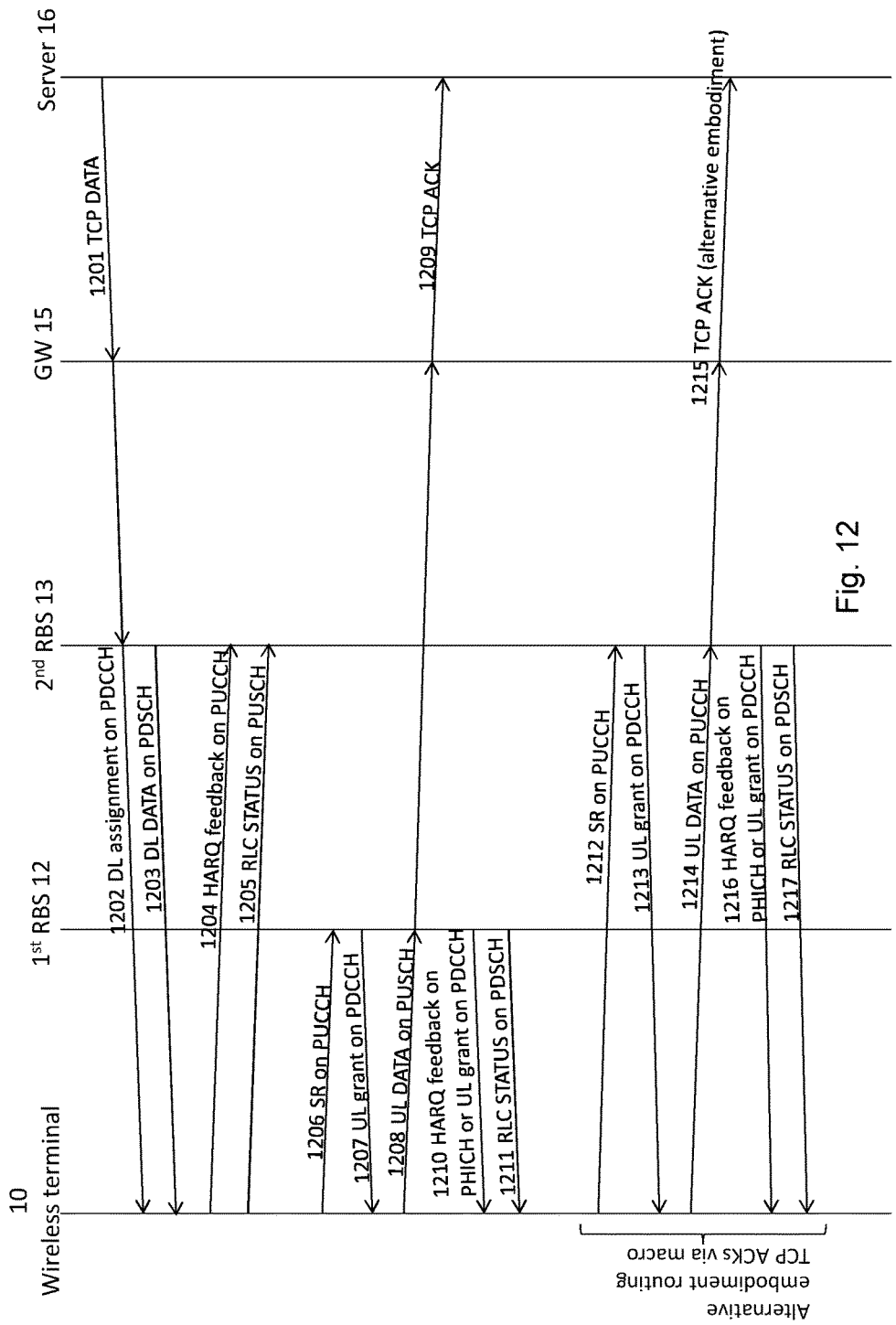
FIG. 12 shows a DL TCP transmission according to embodiments herein.

FIG. 12 shows examples of embodiments herein of a DL TCP transmission according to embodiments 1a & 1b.

Action 1201. The server 16 transmits TCP data, via the GW 15, to the second radio base station 13 to be transmitted to the wireless terminal 10.

Action 1202. The second radio base station 13 transmit a DL assignment on PDCCH to the wireless terminal 10.

Action 1203. The second radio base station 13 then transmits DL data on the PDSCH to the wireless terminal 10.

Action 1204. The wireless terminal 10 transmits HARQ feedback on PUCCH to the second radio base station 13 of the lower layer.

Action 1205. The wireless terminal 10 then transmits RLC status or feedback to the second radio base station 13 on PUSCH to the second radio base station 13.

Action 1206. The wireless terminal 10 may then transmit an SR, for acknowledging the TCP data, on the PUCCH to the first radio base station 12.

Action 1207. The first radio base station 12 transmits an UL grant on PDCCH to the wireless terminal 10 when granted.

Action 1208. The wireless terminal 10 then transmits to the first radio base station 12 the TCP ACK in UL data on the PUSCH.

Action 1209. The first radio base station 12 then forwards the TCP ACK to the server 16 via the GW 15.

Action 1210. The first radio base station 12 sends HARQ feedback on PHICH or an UL grant on PDCCH to the wireless terminal 10.

Action 1211. The first radio base station 12 further sends RLC status on PDSCH to the wireless terminal 10.

As an alternative embodiment the TCP ACK may be routed via the second radio base station 13, being e.g. the macro.

Action 1212. The wireless terminal 10 may then transmit an SR, for acknowledging the TCP data on the PUCCH to the second radio base station 13.

Action 1213. The second radio base station 13 transmits an UL grant on PDCCH to the wireless terminal 10 when granted.

Action 1214. The wireless terminal 10 then transmits to the second radio base station 13 the TCP ACK in UL data on the PUSCH.

Action 1215. The second radio base station 13 then forwards the TCP ACK to the server 16 via the GW 15.

Action 1216. The second radio base station 13 transmits HARQ feedback on PHICH or an UL grant on PDCCH to the wireless terminal 10.

Action 1217. The second radio base station 13 further sends RLC status on PDSCH to the wireless terminal 10.

Figure 13:
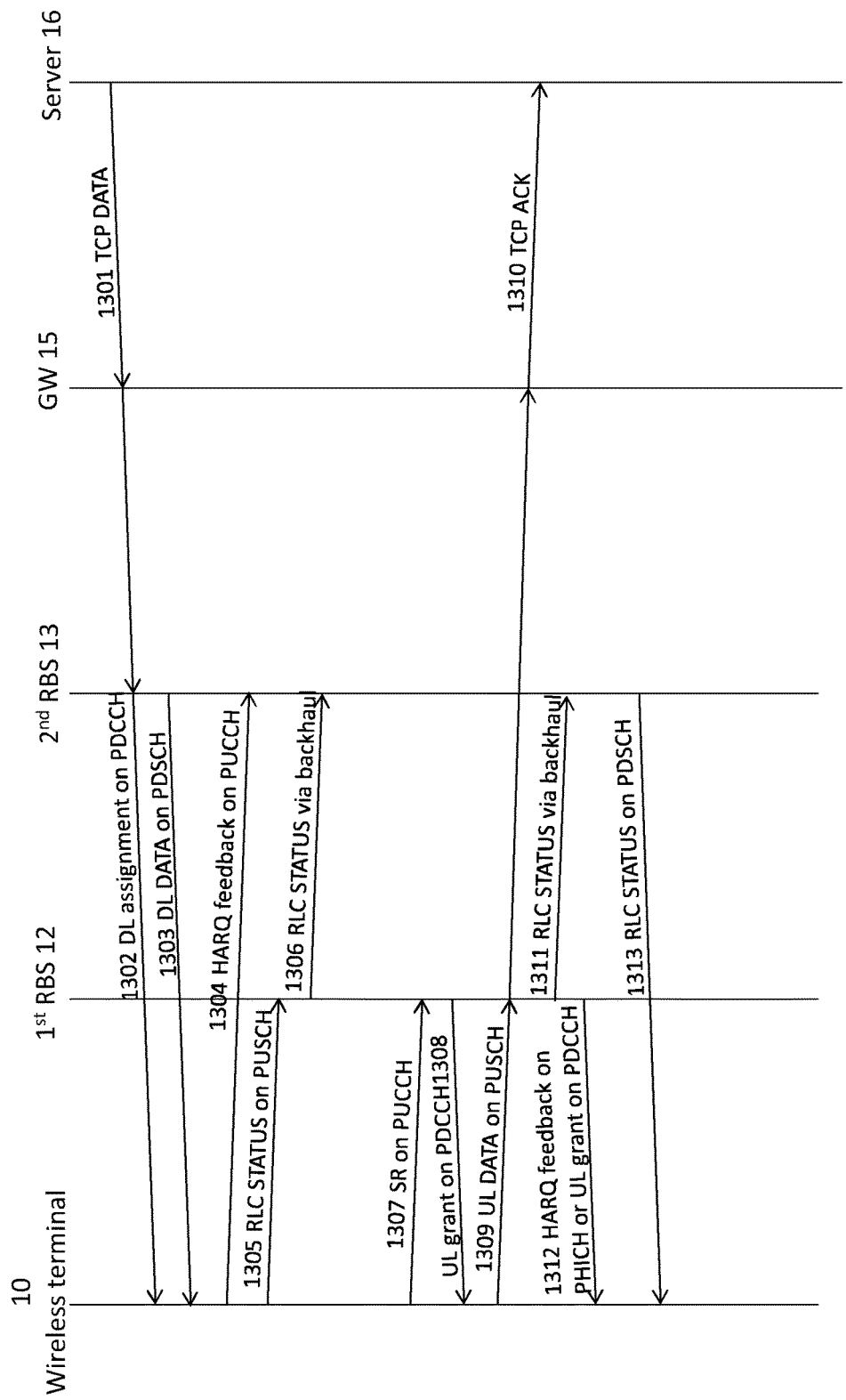
FIG. 13 shows a DL TCP transmission according to embodiments herein.

FIG. 13 shows examples of embodiments herein of a DL TCP transmission according to embodiment 2.

Action 1301. The server 16 transmits TCP data, via the GW 15, to the second radio base station 13 to be transmitted to the wireless terminal 10.

Action 1302. The second radio base station 13 transmit a DL assignment on PDCCH to the wireless terminal 10.

Action 1303. The second radio base station 13 then transmits DL data, the TCP data, on the PDSCH to the wireless terminal 10.

Action 1304. The wireless terminal 10 transmits HARQ feedback on PUCCH to the second radio base station 13 of the lower layer.

Action 1305. The wireless terminal 10 transmits RLC status on PUSCH to the first radio base station 12.

Action 1306. The first radio base station 12 forwards or transmits the RLC status of the DL data via backhaul to the second radio base station 13.

Action 1307. The wireless terminal 10 may then transmit an SR, for acknowledging the TCP data, on the PUCCH to the first radio base station 12.

Action 1308. The first radio base station 12 transmits an UL grant on PDCCH to the wireless terminal 10 when granted.

Action 1309. The wireless terminal 10 then transmits to the first radio base station 12 the TCP ACK in UL data on the PUSCH.

Action 1310. The first radio base station 12 then forwards the TCP ACK to the server 16 via the GW 15.

Action 1311. The first radio base station 12 transmits RLC Status via backhaul to the second radio base station 13.

Action 1312. The first radio base station 12 transmits HARQ feedback on PHICH or UL grant on PDCCH to the wireless terminal 10.

Action 1313. The second radio base station 13 transmits the RLC status to the wireless terminal 10.

Figure 14:
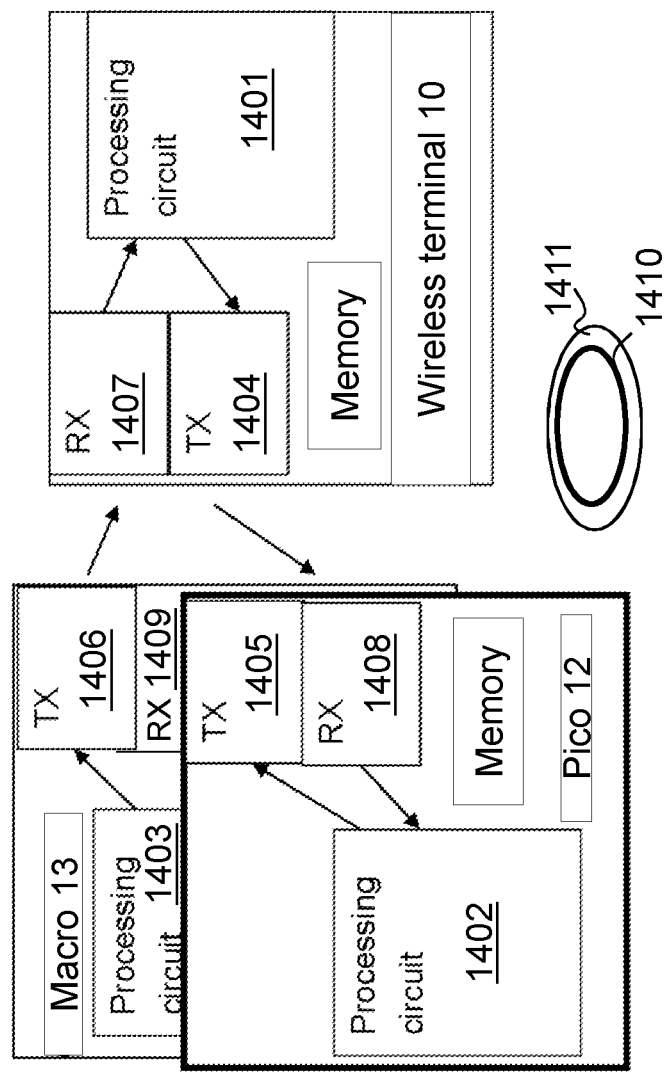
FIG. 14 shows a block diagram depicting the wireless terminal, the first radio base station and the second radio base station.

FIG. 14 is a block diagram depicting examples of the first radio base station, pico, 12 and the second radio base station 13, macro, and also an example of the wireless terminal 10.

The embodiments herein may be implemented through one or more processors, such as a processing circuit 1401-1403 in each of the wireless terminal 10 or the respective radio base station 12,13, together with computer program code for performing the functions and/or method steps of the embodiments herein. The program code mentioned above may also be provided as a computer program product, for instance in the form of a data carrier carrying computer program code for performing embodiments herein when being loaded into the wireless terminal 10 or the respective radio base station. One such carrier may be in the form of a CD ROM disc. It is however feasible with other data carriers such as a memory stick. The computer program code may furthermore be provided as pure program code on a server and downloaded to the wireless terminal 10 or the respective radio base station. The wireless terminal 10 and the respective radio base station comprises a transmitter 1404-1406 and a receiver 1407-1409, or transceivers communicating with each other. For example, the wireless terminal 10 may comprise dual transceivers, or transmitters and receivers, to provide dual connectivity. Furthermore, the wireless terminal 10 and the respective radio base station comprises memories.

The methods according to the embodiments described herein for the wireless terminal 10, the first radio base station 12 and/or the second radio base station 13 are respectively implemented by means of e.g. a computer program 1410 or a computer program product, comprising instructions, i.e., software code portions, which, when executed on at least one processor, cause the at least one processor to carry out the actions described herein, as performed by the wireless terminal 10, the first radio base station 12 and/or the second radio base station 13. The computer program 1410 may be stored on a computer-readable storage medium 1411, e.g. a disc or similar. The computer-readable storage medium 1411, having stored thereon the computer program, may comprise the instructions which, when executed on at least one processor, cause the at least one processor to carry out the actions described herein, as performed by the wireless terminal 10, the first radio base station 12 and/or the second radio base station 13. In some embodiments, the computer-readable storage medium may be a non-transitory computer-readable storage medium.

Figure 15:
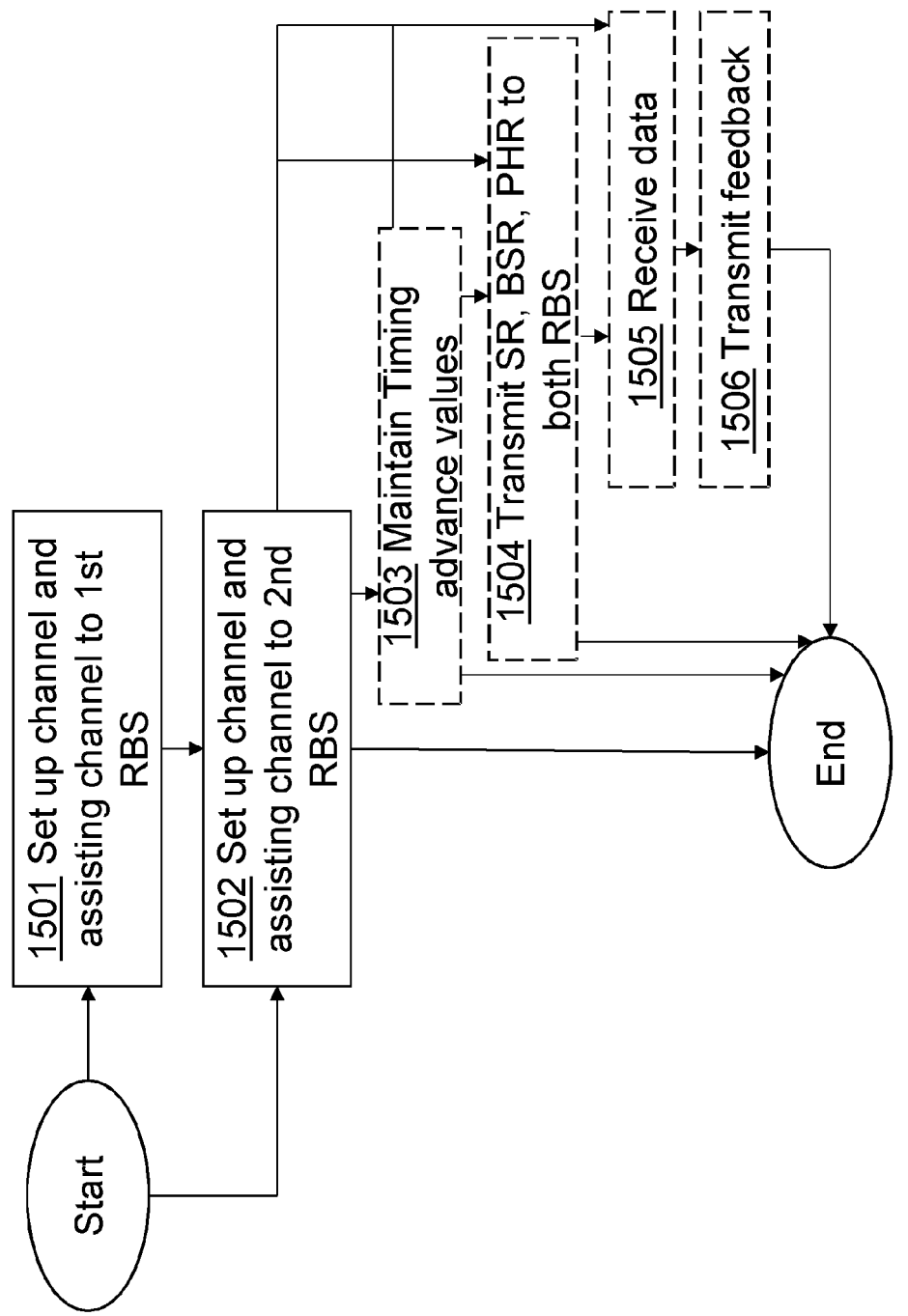
FIG. 15 shows a flowchart depicting a method in the wireless terminal according to embodiments herein.

The method actions in the wireless terminal 10 for enabling communication in the radio communications network 1 according to some embodiments will now be described with reference to a flowchart depicted in FIG. 15. The actions do not have to be taken in the order stated below, but may be taken in any suitable order. Actions performed in some embodiments are marked with dashed boxes. The radio communications network 1 comprises the first radio base station 12 and the second radio base station 13 serving the wireless terminal 10 simultaneously.

Action 1501. The wireless terminal 10 sets up, to the first radio base station 12, a first channel for transmitting data over to the first radio base station 12, and a first assisting channel for receiving feedback data regarding transmissions over the first channel according to configuration received from the first radio base station 12 e.g via the second radio base station 13. The first assisting channel may be set up via the second radio base station 13, see embodiment 2 above.

Action 1502. The wireless terminal 10 sets up, to the second radio base station 13, a second channel for receiving data over from the second radio base station 13, and a 20 second assisting channel for transmitting feedback data regarding transmissions over the second channel according to configuration received from the second radio base station 12. The second assisting channel may be set up via the first radio base station 12, see embodiment 2 above.

The first assisting channel may be a physical downlink shared channel and/or the second assisting channel may be a physical uplink shared channel; or the first assisting channel may be a physical downlink control channel and/or the second assisting channel may be a physical uplink control channel; or the first assisting channel may be an enhanced physical downlink control channel and the second assisting channel may be a physical uplink control channel.

In some embodiments the first assisting and the second assisting channel are only used for feedback information associated to the wireless terminal 10. The wireless terminal 10 may comprise one or more separate protocol entities for the first assisting channel and one or more separate protocol entities for the second assisting channel. The one or more separate entities may be used to set up the respective assisting channel. The one or more separate protocol entities for the first assisting channel may be one or more of a first Physical Layer entity, a first Medium Access Control entity, a first Radio Link Control entity, and a first Packet Data Convergence Protocol entity. The one or more separate protocol entities for the second assisting channel may be one or more of a second Physical Layer entity, a second Medium Access Control entity, a second Radio Link Control entity, and a second Packet Data Convergence Protocol entity.

The feedback data may comprise Radio Link Control Status, Hybrid Automatic Repeat Request Acknowledgements, and/or, to the second radio base station 13, channel state information, such as channel quality indicator (CQI, rank indicator (RI), preferred precoding matrix indicator (PMI), w precoding type indicator (PTI) reporting.

Action 1503. The wireless terminal 10 may maintain separate Timing Advance values for the first radio base station 12 and the second radio base station 13.

Action 1504. The wireless terminal 10 may transmit a scheduling request, a Buffer Status Report, and/or a Power Headroom Report to both the first radio base station 12 and the second radio base station 13. Even though it is only the first radio base station 12 that receives uplink traffic, there may still be a need to also transmit SRs to the second radio base station 13, for example to handle RLC status reports.

Action 1505. The wireless terminal 10 may receive a transmission over a physical downlink shared channel, being the second channel, from the second radio base station 13, and/or a transmission over a physical downlink shared channel from the first radio base station 12. It should be noted that the wireless terminal 10 may transmit data to the first radio base station 12 while being connected to the second radio base station 13.

Action 1506. The wireless terminal 10 may then transmit, over the second assisting channel, feedback data whether transmissions were successfully decoded or not to the second radio base station 13 regarding the transmission from the second radio base station 13, and/or also to the first radio base station 12, regarding the transmission from the first radio base station 12. It should be noted that the wireless terminal 10 may receive feedback data from the first radio base station 12 while being connected to the second radio base station 13.

Figure 16:
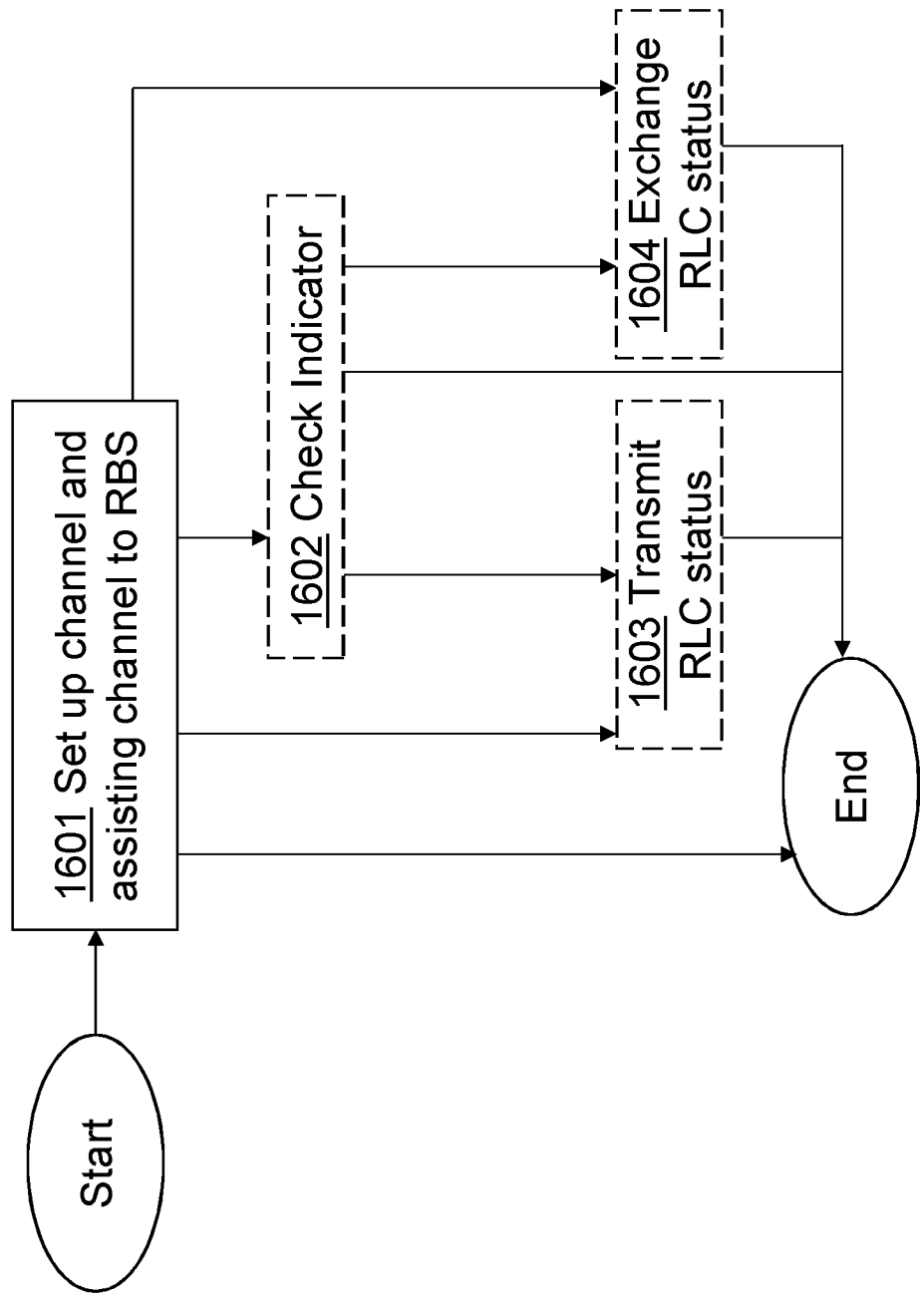
FIG. 16 shows a flowchart depicting a method in the first radio base station according to embodiments herein.

The method actions in the first radio base station 12 for enabling communication with the wireless terminal 10 in the radio communications network 1 according to some embodiments will now be described with reference to a flowchart depicted in FIG. 16. The actions do not have to be taken in the order stated below, but may be taken in any suitable order. Actions performed in some embodiments are marked with dashed boxes. The radio communications network 1 comprises the first radio base station 12 and the second radio base station 13, wherein the first radio base station 12 and the second radio base station 13 serve the wireless terminal 10 simultaneously. The first radio base station 12 being configured to receive uplink data from the wireless terminal 10, and the second radio base station 12 being configured to transmit downlink data to the wireless terminal 10.

Action 1601. The first radio base station 12 sets up a first channel to the wireless terminal 10 for receiving data over from the wireless terminal 10, and a first assisting channel for transmitting, to the wireless terminal 10, feedback data regarding transmissions over the first channel. The first radio base station may send to the wireless terminal configuration for setting up the channels.

Action 1602. The first radio base station 12 may check received data for an indicator to distinguish between data transmissions and a radio link control status report in the feedback data.

Action 1603. The first radio base station 12 transmits a radio link control status to the wireless terminal 10 over the first assisting channel.

Action 1604. Alternatively, the first radio base station 12 may exchange a radio link control status between the first radio base station and the second radio base station 13.

Figure 17:
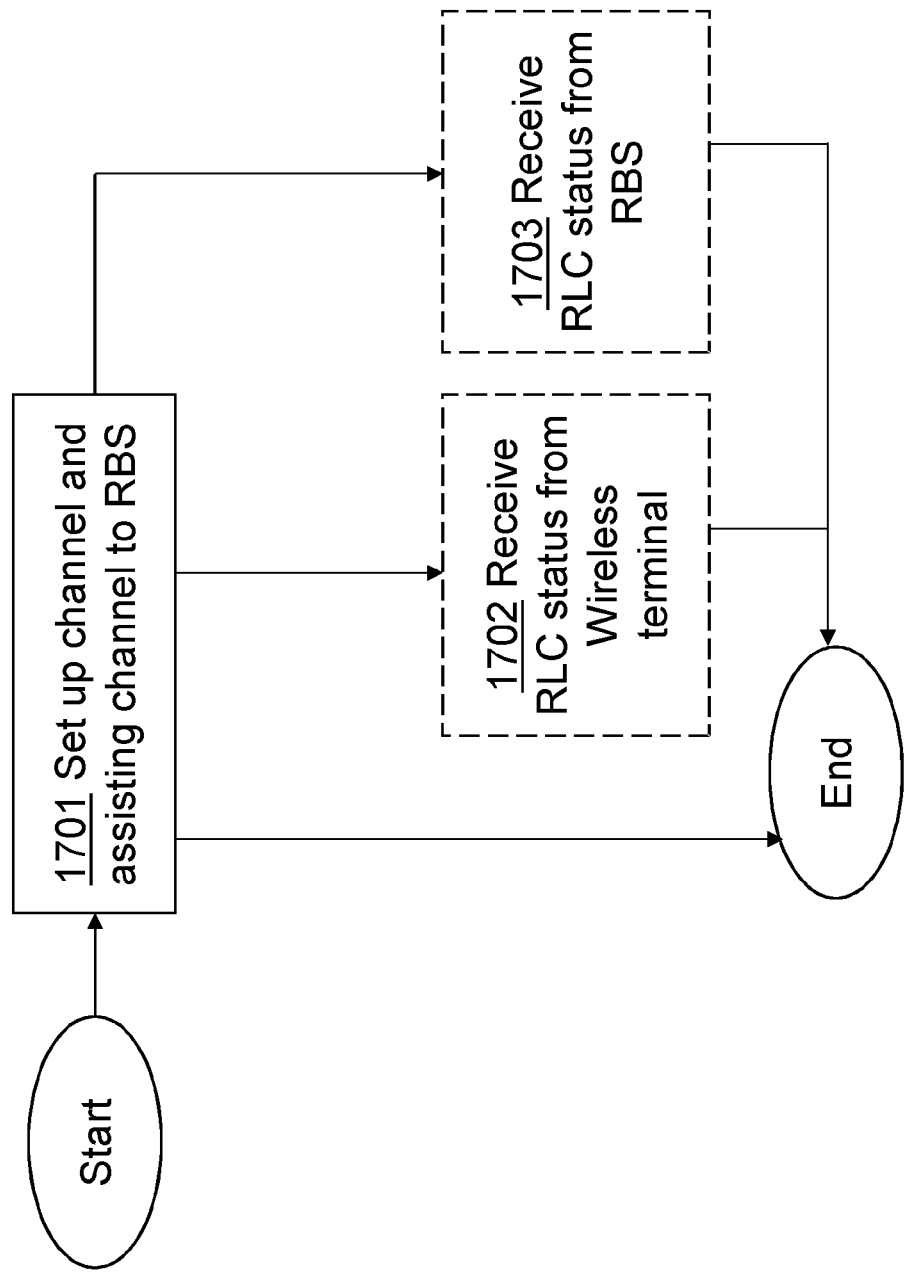
FIG. 17 shows a flowchart depicting a method in the second radio base station according to embodiments herein.

The method actions in the second radio base station 13 for enabling communication with the wireless terminal 10 in the radio communications network 1 according to some embodiments will now be described with reference to a flowchart depicted in FIG. 17. The actions do not have to be taken in the order stated below, but may be taken in any suitable order. Actions performed in some embodiments are marked with dashed boxes. The radio communications network 1 comprises the first radio base station 12 and the second radio base station 13, wherein the first radio base station 12 and the second radio base station 13 serve the wireless terminal 10 simultaneously. The first radio base station 12 being configured to receive uplink data from the wireless terminal 10, and the second radio base station 12 being configured to transmit downlink data to the wireless terminal 10.

Action 1701. The second radio base station 13 sets up a second channel to the wireless terminal 10 for transmitting data over to the wireless terminal 10, and a second assisting channel for receiving, from the wireless terminal 10, feedback data regarding transmissions over the second channel. The second radio base station 13 may configure the wireless terminal 10 with the first channel and the first assisting channel by sending configuration to the wireless terminal 10 but may also configure the wireless terminal 10 with the second channel and the second assisting channel based on information received from the first radio base station 12.

Action 1702. The second radio base station 13 receives a radio link control status from the wireless terminal 10 over the second assisting channel.

Action 1703. Alternatively, the radio base station 13 receives a radio link control status from the first radio base station 12.

Figure 18:
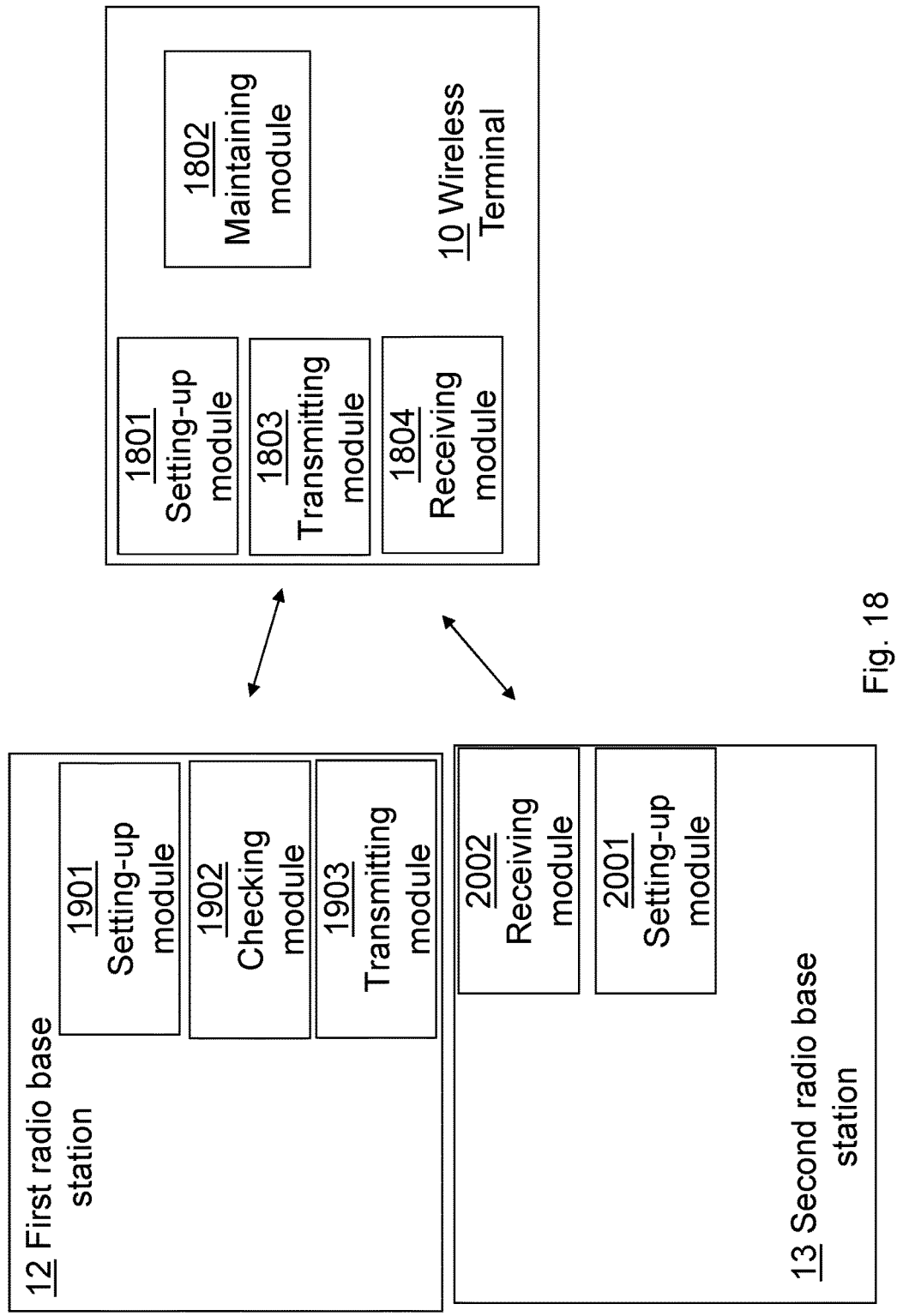
FIG. 18 shows a block diagram depicting the wireless terminal, the first radio base station, and the second radio base station according to embodiments herein.

FIG. 18 discloses the wireless terminal 10, the first radio base station 12 and the second radio base station 13 all being configured to perform the methods disclosed herein.

The wireless terminal 10 for enabling communication in the radio communications network 1. The radio communications network 1 comprises the first radio base station 12 and the second radio base station 13. The wireless device 10 is configured to be served by the first radio base station 12 and the second radio base station 13 simultaneously.

The wireless terminal 10 may comprise a setting up module 1801. The wireless terminal 10, the processing circuit 1401 and/or the setting up module 1801 may be configured to set up, to the first radio base station 12, a first channel for transmitting data over to the first radio base station 12, and a first assisting channel for receiving feedback data regarding transmissions over the first channel according to configuration received from the first radio base station 12 or via the second radio base station 13. E.g. via RRC signalling from e.g. the second radio base station 13. The wireless terminal 10, the setting up module 1801 and/or the processing circuit 1401 may be configured to set-up, to the second radio base station 13, a second channel for receiving data over from the second radio base station 13, and a second assisting channel for transmitting feedback data regarding transmissions over the first channel according to configuration received from the second radio base station 13. The wireless terminal 10, the setting up module 1801 and/or the processing circuit 1401 may be configured to use the first assisting and the second assisting channel only for feedback information associated to the wireless terminal 10. The feedback data may comprise Radio Link Control Status, Hybrid Automatic Repeat Request Acknowledgements, and/or, to the second radio base station 13, channel state information.

The first assisting channel may be a physical downlink shared channel and/or the second assisting channel may be a physical uplink shared channel; or the first assisting channel may be a physical downlink control channel and/or the second assisting channel may be a physical uplink control channel; or the first assisting channel may be an enhanced physical downlink control channel and the second assisting channel may be a physical uplink control channel.

The wireless terminal 10 may be configured with one or more separate protocol entities for the first assisting channel and one or more separate protocol entities for the second assisting channel. The one or more separate protocol entities for the first assisting channel may be one or more of a first Physical Layer entity, a first Medium Access Control entity, a first Radio Link Control entity and a first Packet Data Convergence Protocol entity, the one or more separate protocol entities for the second assisting channel may be one or more of a second Physical Layer entity, a second Medium Access Control entity, a second Radio Link Control entity and a second Packet Data Convergence Protocol entity.

The wireless terminal 10 may comprise a maintaining module 1802. The wireless terminal 10, the processing circuit 1401 and/or the maintaining module 1802 may be configured to maintain separate Timing Advance values for the first radio base station (12) and the second radio base station (13).

The wireless terminal 10 may comprise a transmitting module 1803. The wireless terminal 10, the processing circuit 1401 and/or the transmitting module 1803 may be configured to transmit a scheduling request, a Buffer Status Report, and/or a Power Headroom Report to both the first radio base station 12 and the second radio base station 13.

The wireless terminal 10 may comprise a receiving module 1804. The wireless terminal 10, the processing circuit 1401 and/or the receiving module 1804 may be configured to receive a transmission over a physical downlink shared channel being the second channel from the second radio base station 13, and/or a transmission over a physical downlink shared channel from the first radio base station 12. Then, the wireless terminal 10, the processing circuit 1401 and/or the transmitting module 1803 may be configured to transmit over the second assisting channel feedback data whether transmissions were successfully decoded or not to the second radio base station 13 regarding the transmission from the second radio base station 13, and/or to the first radio base station 12, regarding the transmission from the first radio base station 12. Furthermore, the wireless terminal 10, the processing circuit 1401 and/or the transmitting module 1803 may be configured to transmit data over the first channel to the first radio base station 12, and the wireless terminal 10, the processing circuit 1401 and/or the receiving module 1804 may be configured to receive feedback data of this data transmission over the first assisting channel.

Furthermore, FIG. 18 discloses the first radio base station 12 for enabling communication with the wireless terminal 10 in the radio communications network 1. The radio communications network 1 comprises the first radio base station 12 and the second radio base station 13, wherein the first radio base station 12 is configured to serve the wireless terminal 10 simultaneously as the second radio base station 13. The first radio base station is configured to receive uplink data from the wireless terminal 10, and the second radio base station 12 is configured to transmit downlink data to the wireless terminal 10.

The first radio base station 12 may comprise a setting up module 1901. The first radio base station 12, the processing circuit 1402 and/or the setting up module 1901 is configured to setup the first channel to the wireless terminal 10 for receiving data over from the wireless terminal 10, and the first assisting channel for transmitting, to the wireless terminal 10, feedback data regarding transmissions over the first channel.

The first radio base station 12 may comprise a checking module 1902. The first radio base station 12, the processing circuit 1402, and/or the checking module 1902 may be configured to check received data for an indicator to distinguish between data transmissions and a radio link control status report in the feedback data.

The first radio base station 12 may comprise a transmitting module 1903. The first radio base station 12, the processing circuit 1402, and/or the transmitting module 1903 may be configured to transmit radio link control status to the wireless terminal 10 over the first assisting channel. The first radio base station 12, the processing circuit 1402, and/or the transmitting module 1903 may be configured to exchange radio link control status between the first radio base station 12 and the second radio base station 13.

Furthermore, FIG. 18 discloses the second radio base station 13 for enabling communication with the wireless terminal 10 in the radio communications network 1. The radio communications network 1 comprises the second radio base station 13 and the first radio base station 12. The second radio base station 13 is configured to serve the wireless terminal 10 simultaneously as the first radio base station 12. The first radio base station 12 is configured to receive uplink data from the wireless terminal 10 and the second radio base station 12 is configured to transmit downlink data to the wireless terminal 10.

The second radio base station 13 may comprise a setting up module 2001. The second radio base station 13, the processing circuit 1502, and/or the setting up module 2001 may be configured to setup the second channel to the wireless terminal 10 for transmitting data over to the wireless terminal 10, and a second assisting channel for receiving, from the wireless terminal 10, feedback data regarding transmissions over the second channel.

The second radio base station 13 may comprise a receiving module 2002. The second radio base station 13, the processing circuit 1502, and/or the receiving module 2002 may be configured to receive a radio link control status from the wireless terminal 10 over the second assisting channel. The second radio base station 13, the processing circuit 1502, and/or the receiving module 2002 may be configured to receive a radio link control status from the first radio base station 12.

Those skilled in the art will also appreciate that the various "circuits" or modules described may refer to a combination of analog and digital circuits, and/or one or more processors configured with software and/or firmware, e.g., stored in memory, that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

ABBREVIATIONS

DL Downlink
eNB eNodeB
EPS Evolved Packet System
HARQ Hybrid Automatic Repeat Request
LTE Long Term Evolution
MAC Medium Access Control
PDCCH Physical Downlink Control Channel
PDSCH Physical Downlink Shared Channel
PDCP Packet Data Convergence Protocol
P-GW Packet Gateway
PHY Physical Layer
PUCCH Physical Uplink Control Channel
PUSCH Physical Uplink Shared Channel
RLC Radio Link Control
RRC Radio Resource Control
TCP Transmission Control Protocol
UL Uplink
UE User Equipment Modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:
1. A system for enabling communication in a radio communications network, which system comprises:
a first radio base station;
a second radio base station; and
a wireless terminal, wherein the first radio base station and the second radio base station are configured to serve the wireless terminal simultaneously, the first radio base station is configured to set up for the wireless terminal an uplink channel for receiving data from the wireless terminal and an assisting downlink channel for transmitting feedback data regarding transmissions over the first channel, the second radio base station is configured to set up for the wireless terminal a downlink channel for transmitting data to the wireless terminal and an assisting uplink channel for receiving, from the wireless terminal, feedback data regarding transmissions over the downlink channel, the uplink and the downlink channels and the assisting uplink and the assisting downlink channels enable the first and the second radio base stations to serve the wireless terminal simultaneously, the wireless terminal is configured to transmit one or more of: a scheduling request, a Buffer Status Report, and a Power Headroom Report to both the first radio base station and the second radio base station, and the feedback data comprises one or more of: Radio Link Control Status, Hybrid Automatic Repeat Request Acknowledgements, and to the second radio base station, channel state information.

2. A method in a wireless terminal for enabling communication in a radio communications network, which radio communications network comprises a first radio base station and a second radio base station serving the wireless terminal simultaneously, the method comprising:

setting up, for the first radio base station, an uplink channel for transmitting data to the first radio base station, and an assisting downlink channel for receiving feedback data regarding transmissions over the uplink channel according to configuration received from the first radio base station;

setting up, for the second radio base station, a downlink channel for receiving data from the second radio base station, and an assisting uplink channel for transmitting feedback data regarding transmissions over the downlink channel according to configuration received from the second radio base station, wherein the uplink and the downlink channels and the assisting uplink and the assisting downlink channels enable the first and the second radio base stations to serve the wireless terminal simultaneously; and transmitting one or more of: a scheduling request, a Buffer Status Report, and a Power Headroom Report to both the first radio base station and the second radio base station, wherein the feedback data comprises one or more of: Radio Link Control Status, Hybrid Automatic Repeat Request Acknowledgements, and, to the second radio base station, channel state information.

3. The method according to claim 2, wherein the assisting downlink channel is a physical downlink shared channel and/or the assisting uplink channel is a physical uplink shared channel; or the assisting downlink channel is a physical downlink control channel and/or the assisting uplink channel is a physical uplink control channel, or the assisting downlink channel is an enhanced physical downlink control channel and the assisting uplink channel is a physical uplink control channel.

4. The method according to claim 2, wherein the assisting downlink channel and the assisting uplink channel are only used for feedback information associated to the wireless terminal.

5. The method according to claim 2, wherein the setting up the assisting downlink channel uses one or more separate protocol entities for the assisting downlink channel, and the setting up the assisting uplink channel uses one or more separate protocol entities for the assisting uplink channel.

6. The method according to claim 5, wherein the one or more separate protocol entities for the assisting downlink channel is one or more of a first Physical Layer entity, a first Medium Access Control entity, a first Radio Link Control entity and a first Packet Data Convergence Protocol entity, and the one or more separate protocol entities for the assisting uplink channel is one or more of a second Physical Layer entity, a second Medium Access Control entity, a second Radio Link Control entity and a second Packet Data Convergence Protocol entity.

7. The method according to claim 2, further comprising:
maintaining separate Timing Advance values for the first radio base station and the second radio base station.

8. The method according to claim 2, further comprising:
receiving a transmission over a physical downlink shared channel, being the downlink channel, from the second radio base station, and transmitting, over the assisting uplink channel, feedback data whether transmissions were successfully decoded or not to the second radio base station regarding the transmission from the second radio base station.

9. A method in a first radio base station for enabling communication with a wireless terminal in a radio communications network, which radio communications network comprises the first radio base station and a second radio base station, wherein the first radio base station and the second radio base station serve the wireless terminal simultaneously, and the first radio base station is configured to receive uplink data from the wireless terminal, and the second radio base station is configured to transmit downlink data to the wireless terminal, the method comprising:

setting up an uplink channel to the wireless terminal for receiving data from the wireless terminal, and an assisting downlink channel for transmitting, to the wireless terminal, feedback data regarding transmissions over the uplink channel, wherein the feedback data comprises one or more of: Radio Link Control Status, and Hybrid Automatic Repeat Request Acknowledgements; and receiving one or more of: a scheduling request, a Buffer Status Report, and a Power Headroom Report from the wireless terminal.

10. The method according to claim 9, further comprising:
transmitting a radio link control status to the wireless terminal over the assisting downlink channel.

11. The method according to claim 10, further comprising:
exchanging a radio link control status between the first radio base station and the second radio base station.

12. The method according to claim 9, further comprising:
checking received data for an indicator to distinguish between data transmissions and a radio link control status report in the feedback data.

13. A method in a second radio base station for enabling communication with a wireless terminal in a radio communications network, which radio communications network comprises a first radio base station and the second radio base station, wherein the first radio base station and the second radio base station serve the wireless terminal simultaneously, and the first radio base station is configured to receive uplink data from the wireless terminal and the second radio base station is configured to transmit downlink data to the wireless terminal, the method comprising:

setting up a downlink channel to the wireless terminal for transmitting data over to the wireless terminal, and an assisting uplink channel for receiving, from the wireless terminal, feedback data regarding transmissions over the downlink channel, wherein the feedback data comprises one or more of: Radio Link Control Status, Hybrid Automatic Repeat Request Acknowledgements, and channel state information; and receiving one or more of: a scheduling request, a Buffer Status Report, and a Power Headroom Report from the wireless terminal.

14. The method according to claim 13, further comprising:

receiving a radio link control status from the wireless terminal over the assisting uplink channel.

15. The method according to claim 13, further comprising:

receiving a radio link control status from the first radio base station.

16. A wireless terminal for enabling communication in a radio communications network, which radio communications network comprises a first radio base station and a second radio base station, and the wireless device is configured to be served by the first radio base station and the second radio base station simultaneously, the wireless terminal being configured to:

set up, for the first radio base station, an uplink channel for transmitting data over to the first radio base station, and an assisting downlink channel for receiving feedback data regarding transmissions over the uplink channel according to configuration received from the first radio base station;

set up, for the second radio base station, a downlink channel for receiving data over from the second radio base station, and an assisting uplink channel for transmitting feedback data regarding transmissions over the downlink channel according to configuration received from the second radio base station, wherein the feedback data comprises one or more of: Radio Link Control Status, Hybrid Automatic Repeat Request Acknowledgements, and, to the second radio base station, channel state information, and the uplink and the downlink channels and the assisting uplink and the assisting downlink channels enable the first and the second radio base stations to serve the wireless terminal simultaneously; and the wireless terminal further being configured to transmit one or more of: a scheduling request, a Buffer Status Report, and a Power Headroom Report to both the first radio base station and the second radio base station.

17. The wireless terminal according to claim 16, wherein the assisting downlink channel is a physical downlink shared channel and/or the assisting uplink channel is a physical uplink shared channel; or the assisting downlink channel is a physical downlink control channel and/or the assisting uplink channel is a physical uplink control channel; or the assisting downlink channel is an enhanced physical downlink control channel and the assisting uplink channel is a physical uplink control channel.

18. The wireless terminal according to claim 16, wherein the wireless terminal is configured to use the assisting downlink channel and the assisting uplink channel only for feedback information associated to the wireless terminal.

19. The wireless terminal according to claim 16, being configured with one or more separate protocol entities for the assisting downlink channel and one or more separate protocol entities for the assisting uplink channel.

20. The wireless terminal according to claim 19, wherein the one or more separate protocol entities for the assisting downlink channel is one or more of a first Physical Layer entity, a first Medium Access Control entity, a first Radio Link Control entity and a first Packet Data Convergence Protocol entity, and the one or more separate protocol entities for the assisting uplink channel is one or more of a second Physical Layer entity, a second Medium Access Control entity, a second Radio Link Control entity and a second Packet Data Convergence Protocol entity.

21. The wireless terminal according to claim 16, further being configured to maintain separate Timing Advance values for the first radio base station and the second radio base station.

22. The wireless terminal according to claim 16, further being configured to:

receive a transmission over a physical downlink shared channel, being the downlink channel, from the second radio base station, and transmit, over the assisting uplink channel, feedback data whether transmissions were successfully decoded or not to the second radio base station regarding the transmission from the second radio base station.

23. A first radio base station for enabling communication with a wireless terminal in a radio communications network, which radio communications network comprises the first radio base station and a second radio base station, wherein the first radio base station is configured to serve the wireless terminal simultaneously as the second radio base station, and being configured to receive uplink data from the wireless terminal, wherein the second radio base station is configured to transmit downlink data to the wireless terminal, the first radio base station being configured to:

setup an uplink channel to the wireless terminal for receiving data over from the wireless terminal, and an assisting downlink channel for transmitting, to the wireless terminal, feedback data regarding transmissions over the uplink channel, wherein the feedback data comprises one or more of: Radio Link Control Status, and Hybrid Automatic Repeat Request Acknowledgements; and receive one or more of: a scheduling request, a Buffer Status Report, and a Power Headroom Report from the wireless terminal.

24. The first radio base station according to claim 23, further being configured to:

transmit radio link control status to the wireless terminal over the assisting downlink channel.

25. The first radio base station according to claim 24, further being configured to:

exchange radio link control status between the first radio base station and the second radio base station.

26. The first radio base station according to claim 23, further being configured to:

check received data for an indicator to distinguish between data transmissions and a radio link control status report in the feedback data.

27. A second radio base station for enabling communication with a wireless terminal in a radio communications network, which radio communications network comprises the second radio base station and a first radio base station, wherein the second radio base station is configured to serve the wireless terminal simultaneously as the first radio base station, and the first radio base station is configured to receive uplink data from the wireless terminal and the second radio base station is configured to transmit downlink data to the wireless terminal, the second radio base station being configured to:
- setup a downlink channel to the wireless terminal for transmitting data over to the wireless terminal, and an assisting uplink channel for receiving, from the wireless terminal, feedback data regarding transmissions over the downlink channel, wherein the feedback data comprises one or more of: Radio Link Control Status, Hybrid Automatic Repeat Request Acknowledgements, and channel state information; and
- receive one or more of: a scheduling request, a Buffer Status Report, and a Power Headroom Report from the wireless terminal.

28. The second radio base station according to claim 27, further being configured to:
- receive a radio link control status from the wireless terminal over the assisting uplink channel.

29. The second radio base station according to claim 27, further being configured to:
- receive a radio link control status from the first radio base station.

* * * * *